United States Patent
Nakayama et al.

(10) Patent No.: US 7,541,074 B2
(45) Date of Patent: Jun. 2, 2009

(54) OPTICAL FILM AND OPTICAL COMPENSATORY FILM, POLARIZING PLATE AND LIQUID CRYSTAL DISPLAY USING SAME

(75) Inventors: Hajime Nakayama, Minami-Ashigara (JP); Yusuke Ohashi, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 258 days.

(21) Appl. No.: 11/504,631

(22) Filed: Aug. 16, 2006

(65) Prior Publication Data

US 2007/0190268 A1 Aug. 16, 2007

(30) Foreign Application Priority Data

Aug. 17, 2005 (JP) ............................... 2005-236856

(51) Int. Cl.
*G02F 1/13363* (2006.01)
(52) U.S. Cl. ........................ 428/1.3; 428/412; 349/117; 349/118
(58) Field of Classification Search .................. 428/1.3, 428/1.31, 412; 349/96, 117–118
See application file for complete search history.

(56) References Cited

U.S. PATENT DOCUMENTS

| | | | |
|---|---|---|---|
| 6,565,974 B1 * | 5/2003 | Uchiyama et al. ........... | 428/412 |
| 6,881,453 B2 * | 4/2005 | Kido et al. .................... | 428/1.1 |
| 7,052,747 B2 * | 5/2006 | Nishikouji et al. ............ | 428/1.3 |
| 7,153,547 B2 * | 12/2006 | Nishikouji et al. ............ | 428/1.1 |
| 7,223,451 B2 * | 5/2007 | Uchiyama et al. ............. | 428/1.1 |
| RE39,753 E * | 7/2007 | Uchiyama et al. ............ | 428/412 |
| 2004/0233363 A1 * | 11/2004 | Murayama et al. ........... | 349/117 |
| 2004/0239852 A1 * | 12/2004 | Ono et al. ..................... | 349/118 |

FOREIGN PATENT DOCUMENTS

| JP | 62-210423 A | 9/1987 |
|---|---|---|
| JP | 2587398 B2 | 12/1996 |
| JP | 3027805 B2 | 1/2000 |
| JP | 3330574 B2 | 7/2002 |

* cited by examiner

*Primary Examiner*—Keith D Hendricks
*Assistant Examiner*—Sophie Hon
(74) *Attorney, Agent, or Firm*—Buchanan Ingersoll & Rooney PC

(57) ABSTRACT

An optical film is provided and contains at least one of a polycarbonate copolymer and a blend containing the polycarbonate copolymer. The polycarbonate copolymer contains specific repeating units. The optical film satisfies the following formulae (1) to (4).

$$0.1 < Re(450)/Re(550) < 0.95 \quad (1)$$

$$1.03 < Re(650)/Re(550) < 1.93 \quad (2)$$

$$0.4 < (Re(450)/Rth(450))/(Re(550)/Rth(550)) < 0.95 \quad (3)$$

$$1.05 < (Re(650)/Rth(650))/(Re(550)/Rth(550)) < 1.90 \quad (4)$$

15 Claims, 8 Drawing Sheets

RELATION BETWEEN SLOW AXIS OF FILM AND Re/Rth
(AZIMUTHAL ANGLE = 45°; POLAR ANGLE = 34°)

OPTICAL FILM AND OPTICAL COMPENSATORY FILM, POLARIZING PLATE AND LIQUID CRYSTAL DISPLAY USING SAME

FIELD OF THE INVENTION

The present invention relates to an optical film and an optical compensatory film, a polarizing plate and a liquid crystal display using the same.

BACKGROUND OF THE INVENTION

Liquid crystal displays are widely used in personal computers, mobile equipment monitors and televisions since they have various advantages, e.g., in their low voltage and low consumption power and high possibility for reduction in size and profile. Although a variety of modes depending on how liquid crystalline molecules are aligned in a liquid crystal cell have been proposed for such liquid crystal displays, the dominating mode has hitherto been a TN mode in which liquid crystalline molecules are in an aligned state that their orientations twist by about 90° toward an upper side substrate from a lower side substrate.

In general a liquid crystal display is made up of a liquid crystal cell, an optical compensation film and a polarizer. The optical compensation film is used for dissolution of coloring of images and expansion of a viewing angle, and a stretched birefringent film or a transparent film coated with a liquid crystal is employed as the optical compensation film. For instance, Japanese Patent No. 2587398 discloses the art of expanding a viewing angle by applying to a TN-mode liquid crystal cell the optical compensation film formed by coating a discotic liquid crystal on a triacetyl cellulose film, forcing the liquid crystal into an aligned state and fixing the aligned state. However, liquid crystal displays for television use, which are supposed to be equipped with big screens and to be viewed from various angles, have stringent demands on viewing angle dependence, so even the foregoing art cannot satisfy such demands. Under these circumstances, liquid crystal displays employing modes different from the TN mode, such as an IPS (In-Plane Switching) mode, an OCB (Optically Compensatory Bend) mode and a VA (Vertically Aligned) mode, have been studied. The VA mode in particular has captured the spotlight in liquid crystal displays for TV uses because it can ensure high contrast and relatively high manufacturing yield.

In VA mode, however, although almost complete black display can be given in the normal direction for a panel, light leakage generates when the panel is viewed from an oblique direction, thus the viewing angle becoming narrow. In order to improve this, it has been proposed to reduce light leakage by disposing a retardation plate having such refractive index anisotropy that the refractive index in the film thickness direction is sufficiently smaller than the refractive index in the film plane in at least one position between a liquid crystal layer and a polarizing plate (for example, JP-A-62-210423). It has also been proposed to reduce light leakage by using in combination a first retardation plate having a positive uniaxial refractive index anisotropy and a second retardation plate having such negative refractive index anisotropy that the refractive index in the film thickness direction is sufficiently smaller than the refractive index in the film plane (for example, Japanese Patent No. 3027805). It has further been proposed to improve viewing angle characteristics of a VA mode liquid crystal display by using an optically biaxial retardation plate wherein refractive indexes in three-dimensional directions of the film are all different from each other (for example, Japanese Patent No. 3330574).

However, these methods reduce light leakage only for a light of a certain wavelength region (for example, green light around 550 nm) and do not take into consideration light leakage for a light of other wavelength region (for example, blue light around 450 nm and red light around 650 nm). Therefore, there remained so-called color shift that, when black display is viewed from an oblique direction, the display gives coloration to blue or red.

SUMMARY OF THE INVENTION

An object of an illustrative, non-limiting embodiment of the invention is to provide an optical film giving a high contrast over a wide range and capable of suppressing color shift, an optical compensatory film, a polarizing plate and a liquid crystal display using the same.

The object can be attained by the following means.

1. An optical film comprising at least one of a polycarbonate copolymer and a blend containing the polycarbonate copolymer, the polycarbonate copolymer comprising a repeating unit represented by formula (A) and a repeating unit represented by formula (B), the repeating unit represented by formula (A) amounting to 30 to 80 mol % of the polycarbonate copolymer, the optical film satisfying formulae (1) to (4):

$$0.1 < Re(450)/Re(550) < 0.95 \quad (1)$$

$$1.03 < Re(650)/Re(550) < 1.93 \quad (2)$$

$$0.4 < (Re(450)/Rth(450))/(Re(550)/Rth(550)) < 0.95 \quad (3)$$

$$1.05 < (Re(650)/Rth(650))/(Re(550)/Rth(550)) < 1.90 \quad (4)$$

wherein $Re(\lambda)$ represents an in-plane retardation value by nm of the optical film for a light having a wavelength of $\lambda$ nm, and Rth ($\lambda$) represents a retardation value by nm in a thickness direction of the optical film for a light having the wavelength of $\lambda$ nm;

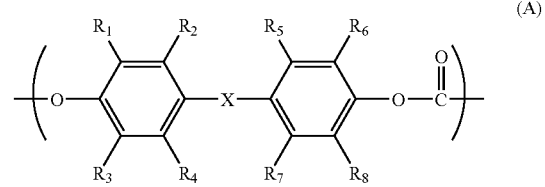

wherein $R_1$ to $R_8$ each independently represents an at least one group selected from the group consisting of a hydrogen atom, a halogen atom and a hydrocarbon group containing from 1 to 6 carbon atoms, and X represents formula (X):

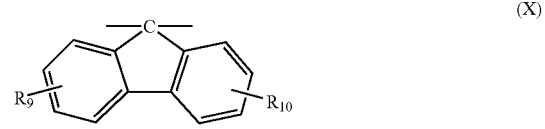

wherein $R_9$ and $R_{10}$ each independently represents a hydrogen atom, a halogen atom or an alkyl group containing from 1 to 3 carbon atoms;

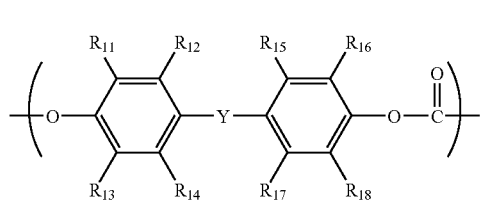

(B)

wherein $R_{11}$ to $R_{18}$ each independently represents an at least one group selected from the group consisting of a hydrogen atom, a halogen atom and a hydrocarbon group containing from 1 to 22 carbon atoms, and Y represents a group selected from the following groups:

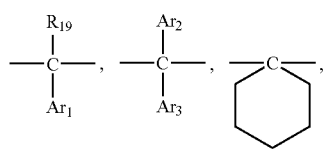

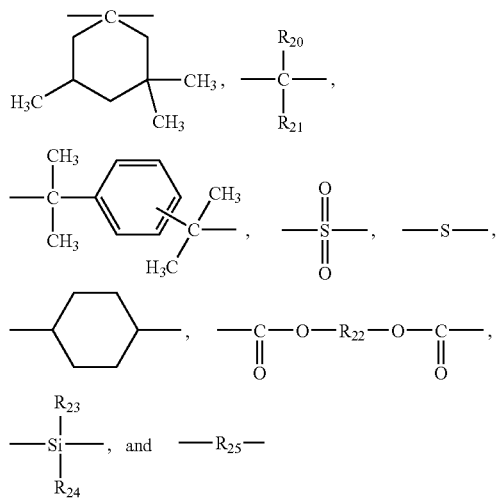

wherein $R_{19}$ to $R_{21}$, $R_{23}$ and $R_{24}$ each independently represents at least one group selected from the group consisting of a hydrogen atom, a halogen atom and a hydrocarbon group containing from 1 to 22 carbon atoms, $R_{22}$ and $R_{25}$ each independently represents an at least one group selected from the group consisting of hydrocarbon groups containing from 1 to 20 carbon atoms, and $Ar_1$ to $Ar_3$ each independently represents at least one group selected from the group consisting of aryl groups containing from 6 to 10 carbon atoms.

2. The optical film as described in above-mentioned 1, wherein the repeating unit represented by formula (A) is a repeating unit represented by formula (C), the repeating unit represented by formula (B) is a repeating unit represented by formula (D), the repeating unit represented by formula (C) amounts to 30 to 60 mol % of the polycarbonate copolymer, and the repeating unit represented by formula (D) amounts to 70 to 40 mol % of the polycarbonate copolymer:

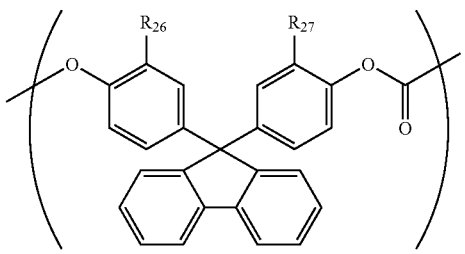

(C)

wherein $R_{26}$ and $R_{27}$ each independently represents a hydrogen atom or a methyl group;

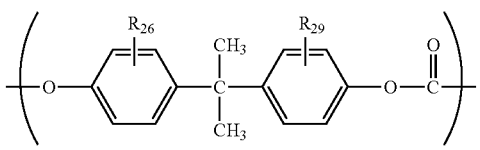

(D)

wherein $R_{28}$ and $R_{29}$ each independently represents a hydrogen atom or a methyl group.

3. The optical film as described in above-mentioned 1 or 2, which further comprises at least one retardation increasing agent comprising a rod-shaped compound or a discotic compound.

4. The optical film as described in any one of above-mentioned 1 to 3, which is a film wet-stretched by a method of forming a film from a solution, with a residual solvent amount being in a range of from 5 to 50% by weight.

5. The optical film as described in any one of above-mentioned 1 to 4, which satisfies formulae (5) and (6):

$$5 < Re(550) < 200 \tag{5}$$

$$10 < Rth(550) < 400. \tag{6}$$

6. An optical compensatory film comprising: an optical film described in any one of above-mentioned 1 to 5; and an optically anisotropic layer having Re(550) of 0 to 200 nm and Rth(550) of −400 to 400 nm.

7. The optical compensatory film as described in above-mentioned 6, wherein the optically anisotropic layer comprises a layer formed from a discotic liquid crystalline molecule.

8. The optical compensatory film as described in above-mentioned 6, wherein the optically anisotropic layer comprises a layer formed from a rod-shaped liquid crystalline molecule.

9. The optical compensatory film as described in above-mentioned 6, wherein the optically anisotropic layer comprises a polymer film.

10. The optical compensatory film as described in above-mentioned 9, wherein the polymer film comprises at least one polymer material selected from the group consisting of polyamide, polyimide, polyester, polyether ketone, polyamidoimidopolyesterimide and polyaryl ether ketone.

11. A polarizing plate comprising: a polarizer; and an optical film described in any one of above-mentioned 1 to 5 or an optical compensatory film described in any one of above-mentioned 6 to 10.

12. A liquid crystal display comprises: two films; and a liquid crystal cell between the two films, wherein at least one of the two films is an optical film described in any one of above-mentioned 1 to 5, an optical compensatory film described in any one of above-mentioned 6 to 10 or a polarizing plate described in above-mentioned 11.

13. The liquid crystal display described in above-mentioned 12, wherein one of the two films is an optical film described in any one of above-mentioned 1 to 5, an optical compensatory film described in any one of above-mentioned 6 to 10 or an polarizing plate described in above-mentioned 11, and the other of the two films is a film satisfying formulae (7) to (11):

$$0 < Re(550) < 10 \tag{7}$$

$$30 < Rth(550) < 400 \tag{8}$$

$$10 < Rth(550)/Re(550) \tag{9}$$

$$1.0 < Rth(450)/Rth(550) < 2.0 \tag{10}$$

$$0.5 < Rth(650)/Rth(550) < 1.0 \tag{11}$$

wherein $Re(\lambda)$ represents an in-plane retardation value by nm of the film for a light having a wavelength of $\lambda$ nm, and $Rth(\lambda)$ represents a retardation value by nm in the thickness direction of the film for a light having the wavelength of $\lambda$ nm.

14. The liquid crystal display as described in above-mentioned 12, wherein each of the two films is an optical film described in any one of above-mentioned 1 to 5, an optical compensatory film described in any one of above-mentioned 6 to 10 or a polarizing plate described in above-mentioned 11.

15. The liquid crystal display as described in any one of above-mentioned 12 to 14, wherein the liquid crystal cell comprises a liquid crystal molecule, wherein a longer axis of the liquid crystal molecule is aligned in a direction substantially vertical to a panel plane of the liquid crystal display in a state of no voltage being applied to the liquid crystal cell.

An aspect of the invention has been completed based on the findings obtained by the intensive investigation of the inventors, wherein wavelength distribution of in-plane retardation of an optical compensatory film and wavelength distribution in the thickness direction are independently controlled by, for example, selecting proper materials and a proper production process to determine its optically optimal value and ensure viewing angle compensation of a liquid crystal cell, particularly, a VA mode liquid crystal cell, giving a black display in almost all wavelength region. As a result, a liquid crystal display of the invention shows a reduced light leakage when obliquely viewed upon black display, thus viewing angle contrast being remarkably improved. Also, since a liquid crystal display of the invention can suppress light leakage when obliquely viewed upon black display in almost all visible light wavelength region, color shift upon black display depending upon viewing angle can markedly be suppressed. According to an aspect of the invention, there can be provided an optical film which has a high contrast ratio over a wide range and which can suppress color shift, and an optical compensatory film, a polarizing plate and a liquid crystal display using the same.

DETAILED DESCRIPTION OF THE INVENTION

Figure 1:
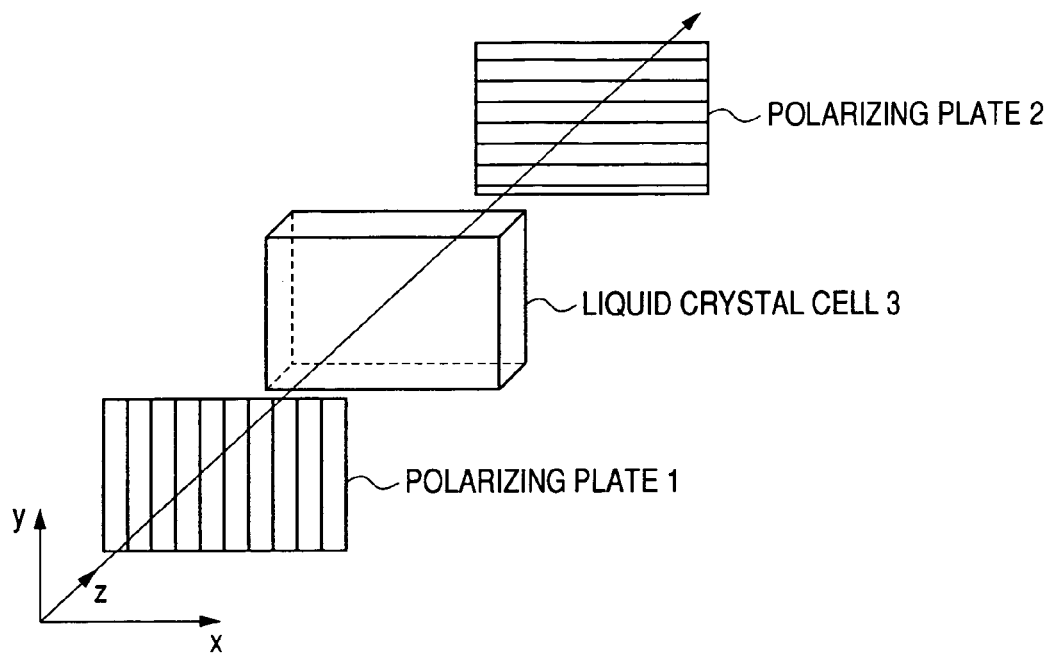
FIG. 1 is a schematic view illustrating an example of a VA mode liquid crystal display in the background art.

An exemplary way how the invention works will be described below. FIG. 1 is a schematic view showing a constitution of a VA mode liquid crystal display. A VA mode liquid crystal display has a liquid crystal cell 3 having a liquid crystal layer wherein liquid crystal molecules are vertically aligned with respect to the substrate plane upon no voltage being applied thereto, i.e., upon giving a black display, and a polarizing plate 1 and a polarizing plate 2 disposed so that they sandwich the liquid crystal cell 3 and their transmission axis directions (shown by striped lines in FIG. 1) cross at right angles with each other. In FIG. 1, incident light enters from the side of the polarizing plate 1. In the case where an incident light enters in the normal direction, i.e., the z axis direction upon no voltage is applied, the light having passed the polarizing plate 1 passes through a liquid crystal cell 3 with keeping the linear polarization state and is completely shielded by the polarizing plate 2. As a result, an image with a high contrast can be displayed.

Figure 2:
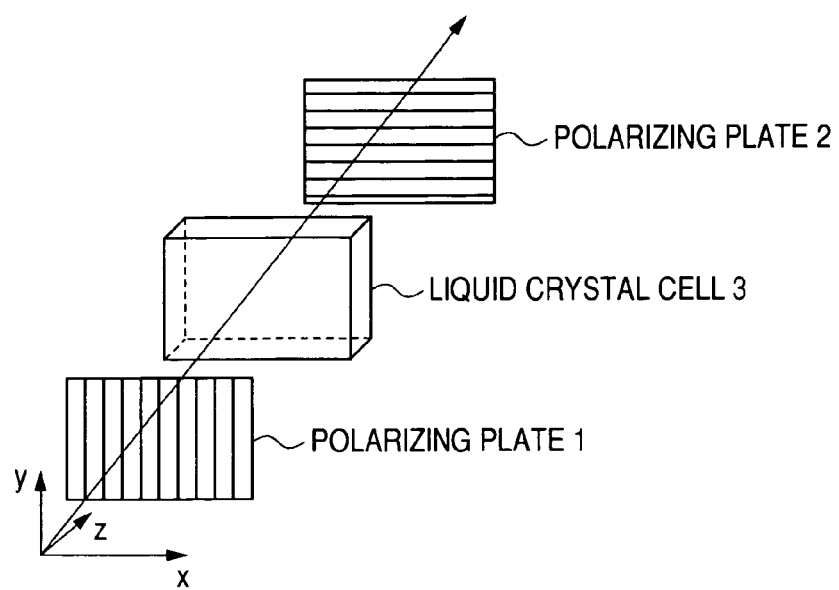
FIG. 2 is a schematic view illustrating an example of a VA mode liquid crystal display in the background art.

However, as is shown in FIG. 2, when an incident light obliquely enters, situations become different. In the case where an incident light enters in an oblique direction which is not the z axis direction, i.e., in a direction oblique with respect to the polarizing directions of the polarizing plates 1 and 2 (so-called OFF AXIS direction), the incident light is influenced, upon passing through the vertically aligned liquid crystal cell layer of the liquid crystal cell 3, by retardation in an oblique direction to undergo change in its polarization state. Further, apparent transmission axes of the polarizing plates 1 and 2 deviate from the disposition of crossing at right angles. These two factors prevent the incident light having obliquely entered in OFF AXIS from being completely shielded by the polarizing plate 2, thus causing light leakage upon black display and reduction in contrast.

Here, polar angle and azimuthal angle are defined. The polar angle is an angle inclined from the normal direction of the film plane, i.e., z-axis in FIGS. 1 and 2. For example, the normal direction of the film plane is a direction of 0 degree in polar angle. The azimuthal angle represents a counterclockwise rotated direction with the positive direction of x-axis being the standard. For example, the positive direction of x-axis is 0 degree in azimuthal angle, and the positive direction of y-axis is 90 degrees in azimuthal angle. The aforesaid oblique direction in OFF AXIS mainly means a case where the polar angle is not 0 degree and the azimutla angle is 45 degrees, 135 degrees, 225 degrees or 315 degrees.

Figure 3:
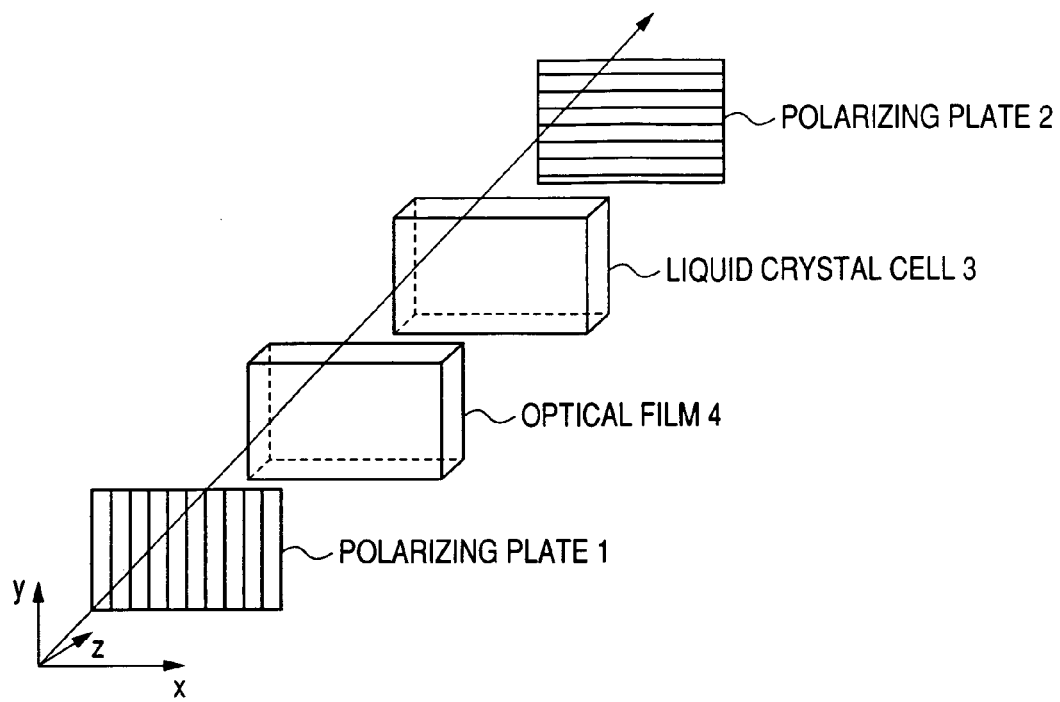
FIG. 3 is a schematic view illustrating an example of a liquid crystal display according to an aspect of the invention.

FIG. 3 is a schematic view showing a structural example for describing how the invention works. The constitution shown by FIG. 3 is a constitution wherein an optical film 4 is disposed between the liquid crystal cell and the polarizing plate 1 in addition to the constitution of FIG. 1.

The optical film 4 satisfies, as has been described hereinbefore, the following relations:

$$0.1 < Re(450)/Re(550) < 0.95 \quad (1)$$

$$1.03 < Re(650)/Re(550) < 1.93 \quad (2)$$

$$0.4 < (Re(450)/Rth(450))/(Re(550)/Rth(550)) < 0.95 \quad (3)$$

$$1.05 < (Re(650)/Rth(650))/(Re(550)/Rth(550)) < 1.90 \quad (4)$$

The invention enables one to perform optical compensation of an obliquely incident light with respect to each wavelength of R, G and B per slow axis and retardation by using the optical film having the above-mentioned optical properties. As a result, in comparison with conventional liquid crystal displays, viewing angle contrast upon black display can be remarkably improved and, further, color shift in a viewing angle direction upon black display can be remarkably reduced. Here, in the invention, as to wavelengths of R, G and B, a wavelength of 650 nm is used for R, a wavelength of 550 nm is used for G, and a wavelength of 450 is used for B. Although wavelengths of R, G and B are not necessarily represented by these wavelengths, they are considered to be suitable wavelengths for specifying optical properties providing the advantages of the invention.

Figure 4:
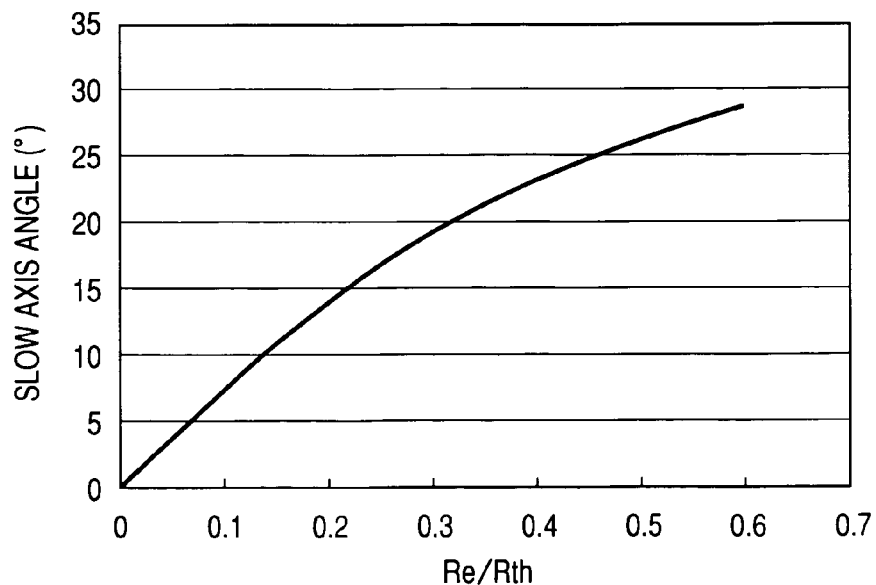
FIG. 4 is a graph showing optical properties of one example of an optical compensatory film to be used in an aspect of the invention.

In particular, in the invention, a ratio of Re to Rth, i.e., Re/Rth is noticed. Because, the Re/Rth value determines two intrinsic polarization axes upon propagation of a light advancing through a biaxial birefringent medium in an oblique direction. FIG. 4 shows one example of a result of calculation of relation between a direction of one of two intrinsic polarization axes and Re/Rth in the case where an obliquely advancing incident light enters an optical film to be used in the invention. Additionally, the direction of propagation of the light was assumed to be 45 degrees in azimuthal angle and 34 degrees in polar angle. It is seen from the results shown in FIG. 4 that, when Re/Rth is determined, one axis of intrinsic polarization is determined. It is mainly determined by in-plane slow axis direction and retardation of an optical film how the polarization state of an incident light changes after its passing through the optical film. In the invention, the relation of Re/Rth is specified with each wavelength of R, G and B, whereby both in-plane slow axis direction and retardation are optimized with each wavelength of R, G and B, which are main factors determining change in polarization state. As a result, even when there exist two factors that, when an incident light enters from an oblique direction, the light is influenced by retardation in an oblique direction of a liquid crystal layer and that apparent transmission axes of the polarizing plates 1 and 2 deviate, complete compensation can be attained by a single optical compensatory film, thus reducing reduction in contrast. When parameters of a film are determined with respect to R, G and B which represent the entire region of visible light, it follows that almost complete compensation can be attained in the entire region of visible light.

Additionally, since VA mode liquid crystal is vertically aligned upon no voltage being applied thereto, i.e., upon giving a black display, it is preferred to render the in-plane slow axis of the optical film 4 vertical or parallel to the polarizing plate 1 or 2 so that, upon black display, polarization state of an incident light entering from the normal direction is not influenced by retardation of the optical film 4. It is possible to additionally dispose an optical film between the polarizing plate 2 and the liquid crystal cell 3. In such case, too, it is preferred to render the in-plane slow axis of the optical film vertical or parallel to the polarizing plate 1 or 2.

Figure 5:
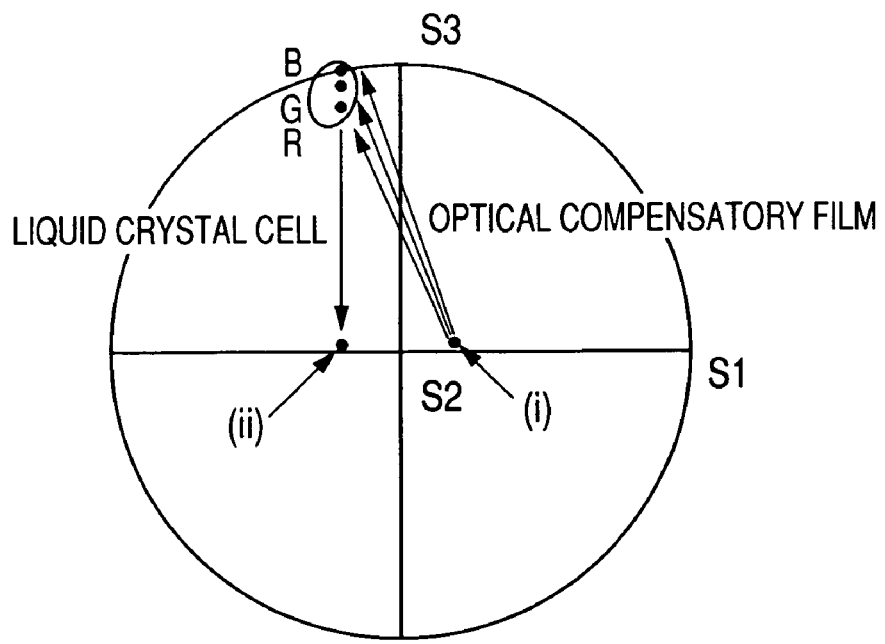
FIG. 5 is a schematic view of a Poincare sphere used for describing change in polarized state of an incident light in a liquid crystal display according to an aspect of the invention.

FIG. 5 is a diagram describing compensation mechanism in the constitution of FIG. 3 using a Poincare sphere. Here, propagation direction of light is 45 degrees in azimuthal angle and 34 degrees in polar angle. In FIG. 5, S2-axis is an axis penetrating the paper from above to below, and FIG. 5 is a diagram of viewing the Poincare sphere from the positive direction of S2-axis. Also, since FIG. 5 is a plane view, displacement of a point between before and after change in polarization state is shown by linear arrows but, actually, change in polarization state caused by passing through the liquid crystal layer or the optical film is represented on the Poincare sphere by rotating with a specific angle around a specific axis determined in accordance with respective optical properties.

The polarization state of an incident light having passed through the polarizing plate shown in FIG. 1 corresponds to a point (i) in FIG. 5, and the polarization state shielded by the absorption axis of the polarizing plate 2 in shown FIG. 3 corresponds to a point (ii) in FIG. 5. With conventional VA mode liquid crystal displays, light leakage of OFF AXIS in an oblique direction is caused by deviation between the point (i) and the point (ii). An optical film is generally used for changing the polarization state of an incident light from the point (i) to the point (ii) including change in polarization state in the liquid crystal layer. The liquid crystal layer of the liquid crystal cell 3 shows positive refractive index anisotropy and is vertically aligned, and hence polarization change of an incident light caused by its passing through the liquid crystal layer is shown on the Poincare sphere by an arrow downward in FIG. 5 as a rotation around S1-axis. Therefore, in order to completely shield a visible light having passed through the liquid crystal layer by the polarizing plate 2, the starting point before rotation must be on the line obtained by rotating the point (ii) around S1-axis with respect to each of R, G and B. Also, the rotation angle is in proportion to a value obtained by dividing a practical retardation from an oblique direction of the liquid crystal layer, $\Delta n'd'$, by wavelength, i.e., $\Delta n'd'/\lambda$, and hence the rotation angles for respective wavelengths of R, G and B different from each other do not coincide with each other. Thus, in order to coincide all of the polarization states for R, G and B with the polarization state of the point (ii), it is necessary, as is shown in FIG. 5, that polarization states of respective R, G and B before rotation are on the line obtained by rotating the point (ii) around S1-axis and at positions corresponding to respective rotation angles. In the invention, in order to render the polarization states of individual R, G and B after passing through the optical film 4 and before passing through the liquid crystal cell 3 to be the above-mentioned polarization states, an optical film having Re/Rth for each of R, G and B satisfying a specific relation is disposed to perform optical compensation.

Figure 6:
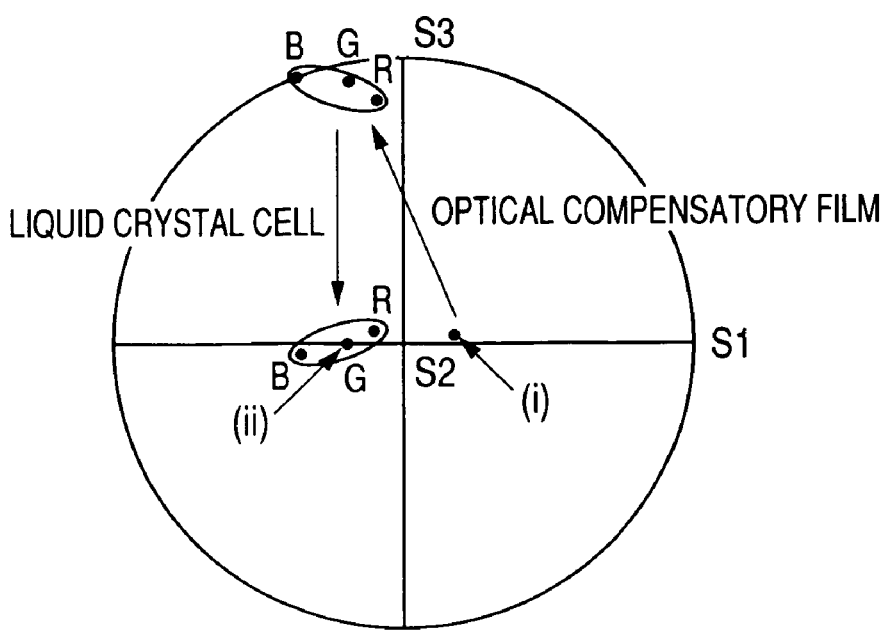
FIG. 6 is a schematic view of a Poincare sphere used for describing change in polarized state of an incident light in a liquid crystal display of the background art.

On the other hand, FIG. 6 shows one example of a prior art. The example shown in FIG. 6 is an example wherein an optical compensation film having a constant Re/Rth for various wavelengths is used. In this case, even when the optical properties of the optical compensation film is adjusted so that, with a G light, the starting point before rotation by the liquid crystal layer is positioned on the line obtained by rotating the point (ii) around S1-axis, it is impossible to position on the line with respect to an R light and a B light. Accordingly, an R light and a B light having passed through the liquid crystal layer do not undergo change in polarization state to the point (ii), thus not being completely shielded by the absorption axis of the polarizing plate. As a result, light leakage arises with the R light and the B light, thus color shift being caused upon black display. The same applies when an optical compensatory film optimized only for an R light and a B light is used.

The invention is characterized in that such optical properties are imparted to a film that the film has different wavelength distribution of retardation between when an incident light enters from the normal direction and when it enters from a direction oblique with respect to the normal direction, for example, from a direction of 60 degrees in polar angle and that the film is positively used as an optical compensatory film. The scope of the invention is not limited by the display mode of liquid crystal layer, and the invention can be applied to a liquid crystal display having a liquid crystal layer of any display mode, such as VA mode, IPS mode, ECB mode, TN mode or OCB mode.

Next, the optical film of the invention will be described in more detail with respect to its optical properties, starting materials and production process.

The optical film of the invention can be effectively used for an optical compensatory film of a liquid crystal display and contributes to enlargement of viewing angle contrast of, particularly, a VA mode liquid crystal display and reduction of color shift depending upon viewing angle. The optical film of the invention may be disposed between a polarizing plate on the viewer's side and a liquid crystal cell or between a polarizing plate on the rear side and the liquid crystal cell or both of them. For example, it may be incorporated as an independent member within a liquid crystal display or as one member constituting a polarizing plate within a liquid crystal display by imparting the optical properties to a protective film which protects a polarizing film to thereby make the protective film function also as an optical compensatory film.

As has been described hereinbefore, the optical film of the invention satisfies the following relation:

$$0.1 < Re(450)/Re(550) < 0.95 \quad (1)$$

$$1.03 < Re(650)/Re(550) < 1.93 \quad (2)$$

$$0.4 < (Re(450)/Rth(450))/(Re(550)/Rth(550)) < 0.95 \quad (3)$$

$$1.05 < (Re(650)/Rth(650))/(Re(550)/Rth(550)) < 1.90 \quad (4)$$

Preferably, the optical film satisfies the following relation:

$$0.2 < Re(450)/Re(550) < 0.9 \quad (1)$$

$$1.05 < Re(650)/Re(550) < 1.9 \quad (2)$$

$$0.5 < (Re(450)/Rth(450))/(Re(550)/Rth(550)) < 0.9 \quad (3)$$

$$1.1 < (Re(650)/Rth(650))/(Re(550)/Rth(550)) < 1.8 \quad (4)$$

Also, the optical film of the invention preferably satisfies the following relation:

$$5 \leq Re(550) \leq 200 \quad (5)$$

$$10 \leq Rth(550) \leq 400. \quad (6)$$

Preferably, the optical film satisfies the following relation:

$$20 \leq Re(550) \leq 150 \quad (5)$$

$$50 \leq Rth(550) \leq 300. \quad (6)$$

(Retardation and its Wavelength Distribution Properties)

In this specification, $Re(\lambda)$ and $Rth(\lambda)$ respectively represent in-plane retardation and retardation along the thickness (under the environment of 25° C. and 60% RH). $Re(\lambda)$ can be measured by irradiating with an incident light of λnm in wavelength in the normal direction of the film using KOBRA 21ADH (manufactured by Ohji Measurement Co., Ltd.). Rth (λ) can be calculated by KOBRA 21ADH based on retardation values measured in three directions, i.e., the aforementioned $Re(\lambda)$, a retardation value measured by irradiating with an incident light of λnm in wavelength in the direction inclined at an angle of +40° from the normal line of the film with taking the slow axis in plane (determined by KOBRA 21ADH) as an inclination axis (rotation axis), and a retardation value measured by irradiating with an incident light of λnm in wavelength in the direction inclined at an angle of −40° from the normal line of the film with taking the slow axis in plane as an inclination axis (rotation axis). Here, as an assumed value of average refractive index, those described in a polymer handbook (John Wiley & Sons, Inc.) and catalogues of various optical films can be used. As to films whose average refractive index is unknown, it can be known by measuring with an Abbe's refractometer. Values of average refractive index of main films are illustrated below. Cellulose acylate (1.48), cycloolefin polymer (1.52), polycarbonate (1.59), polymethyl methacrylate (1.49) and polystyrene (1.59). $n_x$, $n_y$ and $n_z$ are calculated by imputing these assumed average refractive index values and the thickness into KOBRA 21ADH. $N_z=(n_x-n_z)/(n_x-n_y)$ is further calculated from the thus calculated $n_x$, $n_y$ and $n_z$.

Also, retardation in the thickness direction of the entire optical film (Rth) preferably corresponds to a value enough to cancel retardation of the liquid crystal layer, thus being different depending upon the mode of each liquid crystal layer. For example, in the case of using for optical compensation of a VA mode liquid crystal cell (e.g., a VA mode liquid crystal cell having a liquid crystal layer of from 0.2 to 1.0 μm in the product of thickness d (μm) and refractive index anisotropy Δn), Δn·d, the retardation is preferably from 10 to 400 nm, more preferably from 50 nm to 350 nm, still more preferably from 100 to 300 nm. The Re retardation value is not particularly limited, but is generally from 5 to 200 nm, preferably from 20 to 150 nm, more preferably from 50 to 100 nm.

There is no particular limit as to thickness of the optical film, but is preferably 300 μm or less, more preferably from 40 to 250 μm, still more preferably from 60 to 250 μm, yet more preferably from 80 to 200 μm.

These factors of the optical film of the invention can be adjusted within desired ranges by properly selecting polymer materials, compounding amounts thereof, additives and production conditions, and such optical film can provide an optical compensatory film satisfying the above-mentioned optical properties.

The polycarbonate copolymer to be used for the optical film of the invention will be described below.

The polycarbonate copolymer is a polycarbonate copolymer which comprises a repeating unit represented by the following formula (A) and a repeating unit represented by the following formula (B), with the repeating unit represented by formula (A) amounting to 80 to 30 mol % of the total repeating units.

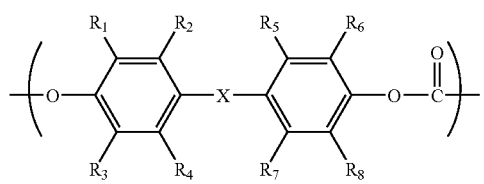
(A)

In the above formula (A), $R_1$ to $R_8$ each independently represents a member selected from among a hydrogen atom, a halogen atom and a hydrocarbon group containing from 1 to 6 carbon atoms. Examples of such hydrocarbon group containing from 1 to 6 carbon atoms include alkyl groups such as a methyl group, an ethyl group, an isopropyl group and a cyclohexyl group and aryl groups such as a phenyl group. Of these, a hydrogen atom and a methyl group are preferred.

X is represented by the following formula (X) wherein $R_9$ and $R_{10}$ each independently represents a hydrogen atom, a halogen atom or an alkyl group containing from 1 to 3 carbon atoms. As a halogen atom and an alkyl group containing from 1 to 3 carbon atoms, there can be illustrated the same ones as described above.

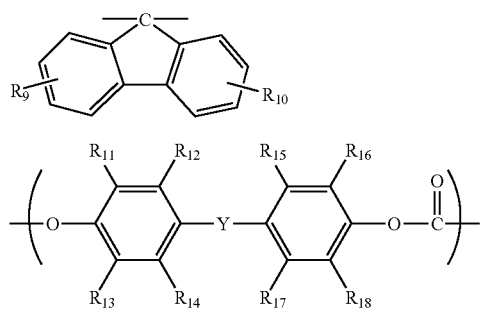
(X)
(B)

In the above formula (B), $R_{11}$ to $R_{18}$ each independently represents a member selected from among a hydrogen atom, a halogen atom and a hydrocarbon group containing from 1 to 22 carbon atoms. Examples of such hydrocarbon group containing from 1 to 22 carbon atoms include alkyl groups such as a methyl group, an ethyl group, an isopropyl group and a cyclohexyl group and aryl groups such as a phenyl group, a biphenyl group and a terphenyl group. Of these, a hydrogen atom and a methyl group are preferred.

Y represents a group selected from the following groups:

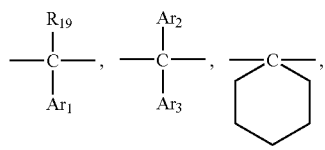

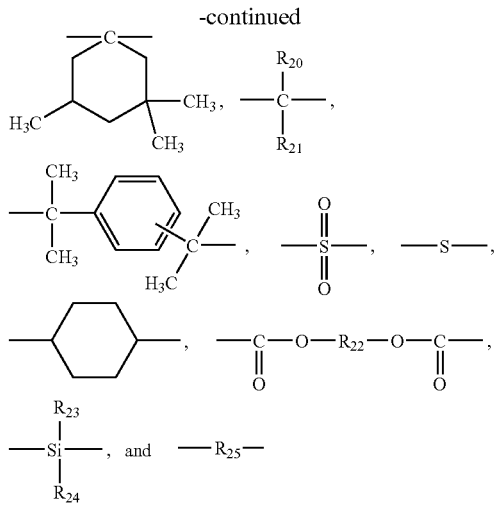

wherein $R_{19}$ to $R_{21}$, $R_{23}$ and $R_{24}$ each independently represents at least one group selected from among a hydrogen atom, a halogen atom and a hydrocarbon group containing from 1 to 22 carbon atoms. As such hydrocarbon group, there can be illustrated the same ones as described above. $R_{22}$ and $R_{25}$ each independently represents a group selected from among hydrocarbon groups containing from 1 to 20 carbon atoms. Examples of such hydrocarbon group include a methylene group, an ethylene group, a propylene group, a butylenes group, a cyclohexylene group, a phenylene group, a naphthylene group and a terphenylene group. As $Ar_1$ to $Ar_3$, there can be illustrated aryl groups containing from 6 to 10 carbon atoms such as a phenyl group and a naphthyl group.

As the polycarbonate copolymer, a polycarbonate copolymer comprising from 30 to 60 mol % of a repeating unit represented by the following formula (C) and from 70 to 40 mol % of a repeating unit represented by the following formula (D).

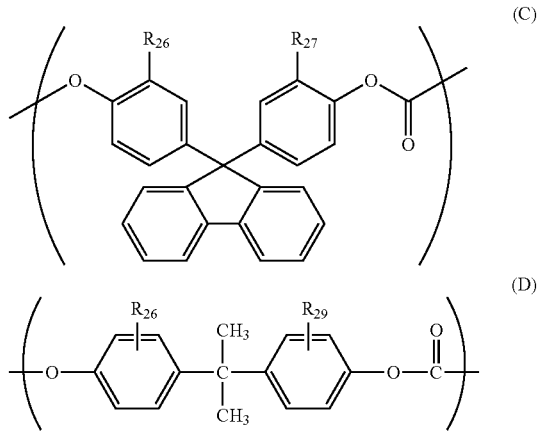
(C)
(D)

More preferred is a polycarbonate copolymer comprising from 45 to 55 mol % of the repeating unit represented by the above formula (C) and from 55 to 45 mol % of the repeating unit represented by the above formula (D)

In the above formula (C), $R_{26}$ to $R_{27}$ each independently represents a hydrogen atom or a methyl group, preferably a methyl group from the viewpoint of handling properties.

In the above formula (D), $R_{28}$ to $R_{29}$ each independently represents a hydrogen atom or a methyl group, preferably a hydrogen atom from the viewpoint of production cost and film properties.

As the optical film in the invention, an optical film using a polycarbonate copolymer having the above-described fluorene skeleton is preferred. As the polycarbonate copolymer having the fluorene skeleton, for example, a blend of polycarbonate copolymers comprising the repeating unit represented by the above formula (A) and the repeating unit represented by the above formula (B) with different composition ratios is preferred. The content of the repeating unit represented by the above-described formula (A) is preferably from 80 to 30 mol %, more preferably from 75 to 35 mol %, still more preferably from 70 to 40 mol %, of the entire polycarbonate copolymer.

The copolymer may be a copolymer wherein the repeating unit represented by the above formula (A) is a combination of two or more of the repeating units represented by the above formula (A) and the repeating unit represented by the above formula (B) is a combination of two or more of the repeating units represented by the above formula (B).

Here, the molar ratio of the entire bulk of polycarbonates constituting the optical film can be determined by means of, for example, a nuclear magnetic resonance (NMR) apparatus.

The polycarbonate copolymer can be produced according to known processes. A process of polycondensation between a dihydroxy compound and phosgene or a process of melt polycondensation can preferably be employed.

The limiting viscosity of the polycarbonate copolymer is preferably from 0.3 to 2.0 dl/g. When the limiting viscosity is less than 0.3, there arises a problem that the resulting film becomes fragile and fails to maintain mechanical strength whereas, when more than 2.0, there arise a problem that die line generates in the film formation from a solution due to a too much increased viscosity of the solution and a problem that purification upon completion of polymerization becomes difficult.

Also, the optical film of the invention may be a composition (blend) of the polycarbonate copolymer and other high molecular compound. In this case, the high molecular compound is required to be optically transparent, and hence those compounds are preferred which are compatible with the polycarbonate copolymer or which have about the same refractive index as the copolymer. As a specific example of the other high molecular compound, there can be illustrated poly(styrene-co-maleic acid anhydride). The composition ratio of the polycarbonate copolymer to the high molecular compound, i.e., the polycarbonate copolymer:the high molecular compound, is 80 to 30% by weight:20 to 70% by weight, preferably 80 to 40% by weight:20 to 60% by weight. With the blend too, each of the repeating units of the polycarbonate copolymer may be a combination of two or more thereof. Also, with the blend, a compatible blend is preferred. However, with a blend wherein components are not completely compatible with each other, it is possible to suppress scattering of light between the components and improve transparency by rendering the refractive indexes of individual components compatible with each other. Additionally, as the blend, three or more kinds of materials may be combined, and a plurality of the polycarbonate copolymers and other high molecular compound may be used in combination.

The weight-average molecular weight of the polycarbonate copolymer is from 1,000 to 1,000,000, preferably from 5,000 to 500,000. The weight-average molecular weight of the other high molecular compound is from 500 to 100,000, preferably from 1,000 to 50,000.

(Retardation Increasing Agent)

The optical film of the invention preferably further contains one or more retardation increasing agents comprising discotic or rod-shaped compounds. Incorporation of the retardation increasing agent enables one to bring the in-plane retardation Re and the retardation in the thickness direction Rth to desired values and impart wavelength distribution properties so that Re and Rth at each wavelength satisfies formulae (1) to (4). In particular, in the invention, since the polycarbonate structure makes it possible to adjust wavelength distribution of Re to a desired range, the retardation increasing agent mainly makes it possible to bring wavelength distribution of Rth to a desired range. To bring the wavelength distribution of Rth to a desired range is supposedly caused by the discotic or rod-shaped compound having absorption in the shorter wavelength region which almost horizontally aligns in the film and relatively more increases Rth in the shorter wavelength region than Rth in the longer wavelength region.

In order to relatively more increase Rth in the shorter wavelength region than in the longer wavelength region, both the discotic compound and the rod-shaped compound may preferably be used. However, in view of the almost horizontally aligning ability, use of the discotic compound is more preferred.

The retardation increasing agent is a compound which, when added in an amount of 1 part by weight per 100 parts by weight of the polymer component in the optical film of the invention, increases the values of Re and Rth by 0.11 or more, preferably 0.2 or more, still more preferably 0.3 or more, per micron of film thickness.

As the discotic or rod-shaped compound, compounds having at least two aromatic rings can be used.

The discotic compound is superior to the rod-shaped compound with respect to Rth retardation increasing ability. Hence, in the case where a particularly large Rth retardation is required, the discotic compound is preferably used.

Two or more retardation increasing agents may be used in combination thereof.

The retardation increasing agent comprising the rod-shaped or discotic compound preferably has the maximum absorption in the wavelength region of from 250 to 400 nm and does not have substantial absorption in the visible region.

(Discotic Compound)

Specific examples of the retardation increasing agent comprising the discotic compound to be preferably used in the invention will be described below which, however, are not limitative at all.

In the invention, discotic compounds represented by the following formula (I) are preferably used as the retardation increasing agents. The compounds represented by formula (I) have a molecular structure of rotationally symmetric properties with a triazine ring being a center, and therefore show a high retardation increasing ability and, in addition, can be produced inexpensively, thus being preferred.

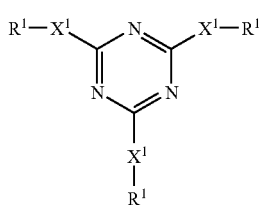

Formula (I)

In the above formula (I), $R^1$s each independently represents an aromatic ring having a substituent in at least one of o-, m- and p-positions or a hetero ring.

$X^1$s each independently represents a single bond or —$NR^3$— wherein $R^3$s each independently represents a hydrogen atom, a substituted or unsubstituted alkyl group, an alkenyl group, an aryl group or a hetero ring group.

An aromatic ring represented by $R^1$ is preferably phenyl or naphthyl, with phenyl being particularly preferred. The aromatic ring represented by $R^1$ may have at least one substituent at any of the substitution positions. Examples of the substituent include a halogen atom, hydroxyl, cyano, nitro, carboxy, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, carbamoyl, an alkyl-substituted carbamoyl group, an alkenyl-substituted carbamoyl group, an aryl-substituted carbamoyl group, an amido group, an alkylthio group, an alkenylthio group, an arylthio group and an acyl group.

A hetero ring group represented by $R^1$ preferably has aromaticity. Hetero rings having aromaticity are generally unsaturated hetero rings and preferably have maximum double bonds. The hetero rings are preferably 5-, 6- or 7-membered rings, more preferably 5- or 6-membered rings, most preferably 6-membered rings. A hetero atom of the hetero ring is preferably nitrogen atom, sulfur atom or oxygen atom, particularly preferably nitrogen atom. As the hetero ring having aromaticity, a pyridine ring (2-pyridyl or 4-pyridyl as a hetero ring group) is particularly preferred. The hetero ring may have a substituent. Examples of the substituent for the hetero ring are the same as examples of the substituent for the above-described aryl moiety.

As the hetero ring group when $X^1$ represents a single bond, a hetero ring group having a nitrogen atom with a free valence is preferred. The hetero ring group having a nitrogen atom with a free valence is preferably a 5-, 6- or 7-membered ring, more preferably a 5- or 6-membered ring, most preferably a 5-membered ring. The hetero ring group may have a plurality of nitrogen atoms. Also, the hetero ring group may have other hetero atom (e.g., O or S) other than nitrogen atom. Examples of the hetero ring group having a nitrogen atom with a free valence are shown below.

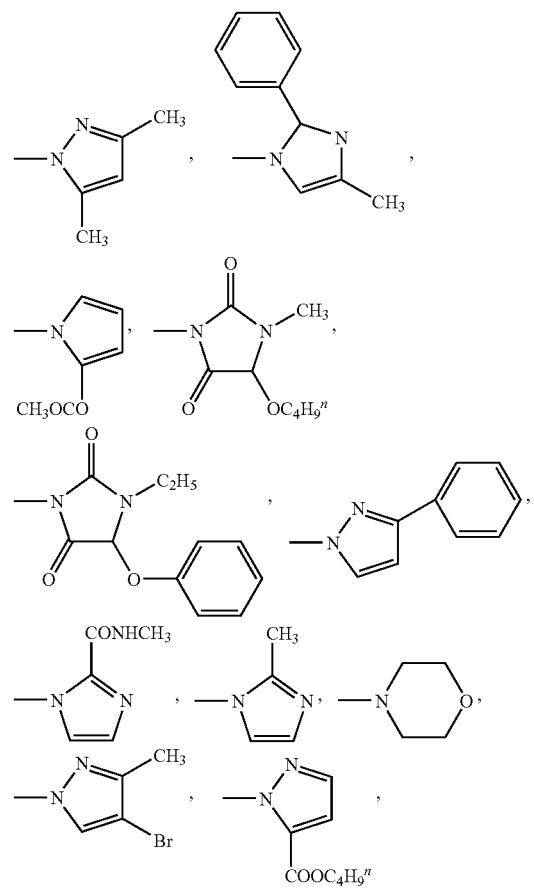

As is described above, $X^1$ in formula (I) represents a single bond or —$NR^3$—, $R^3$s each independently represents a hydrogen atom, a substituted or unsubstituted alkyl group, an alkenyl group, an aryl group or a hetero ring group. An alkyl group represented by $R^3$ may be a cyclic alkyl group or a chain alkyl group. However, a chain alkyl is preferred, and a straight alkyl group is more preferred than a branched alkyl group. The alkyl group contains preferably from 1 to 30 carbon atoms, more preferably from 1 to 20 carbon atoms, still more preferably from 1 to 10 carbon atoms, yet more preferably from 1 to 8 carbon atoms, most preferably from 1 to 6 carbon atoms. The alkyl group may have a substituent. Examples of the substituent include a halogen atom, an alkoxy group (e.g., methoxy or ethoxy) and an acyloxy group (e.g., acryloyloxy or methacryloyloxy).

An alkenyl group represented by $R^3$ may be a cyclic alkenyl group or a chain alkenyl group. However, a chain alkenyl group is preferred, and a straight alkenyl group is more preferred than a branched alkenyl group. The alkenyl group contains preferably from 2 to 30 carbon atoms, more preferably from 2 to 20 carbon atoms, still more preferably from 2 to 10 carbon atoms, yet more preferably from 2 to 8 carbon atoms, most preferably from 2 to 6 carbon atoms. The alkenyl group may have a substituent. Examples of the substituent are the same as the substituents for the alkyl group.

An aromatic ring group and a hetero ring group represented by $R^3$ are the same as the aromatic group and the hetero ring group represented by $R^1$, and preferred scopes are also the same as described there. The aromatic ring group and the hetero ring group may have a substituent. Examples of the substituent are the same as the substituents for the aromatic ring group and the hetero ring group represented by $R^1$.

The molecular weight of the discotic compound represented by formula (I) is preferably from 300 to 800.

It is also possible to use a UV absorbent in combination with the retardation increasing agent comprising the discotic compound represented by formula (I). The amount of the UV absorbent to be used is preferably 10% or less, more preferably 3% or less, based on the retardation increasing agent comprising the discotic compound represented by formula (I).

Specific examples of the retardation increasing agent comprising the discotic compound represented by formula (I) will be shown below. Plural Rs in each example mean the same group. Definitions of R are given after formulas together with specific example numbers.

(1)~(66)

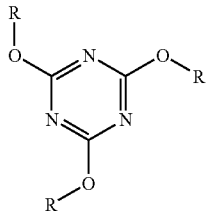

(1) Phenyl
(2) 3-Ethoxycarbonylphenyl
(3) 3-Butoxyphenyl
(4) m-Biphenyl
(5) 3-Phenylthiophenyl
(6) 3-Chlorophenyl
(7) 3-Benxoylphenyl
(8) 3-Acetoxyphenyl
(9) 3-Benzoyloxyphenyl
(10) 3-Phenoxycarbonylphenyl
(11) 3-Methoxyphenyl
(12) 3-Anilinophenyl
(13) 3-Isobutyrylaminophenyl
(14) 3-Phenoxycarbonylaminophenyl
(15) 3-(3-ethylureido)phenyl
(16) 3-(3,3-Diethylureido)phenyl
(17) 3-Methylphenyl
(18) 3-Phenoxyphenyl
(19) 3-Hydroxyphenyl
(20) 4-Ethoxycarbonylphenyl
(21) 4-Butoxyphenyl
(22) p-Biphenylyl
(23) 4-Phenylthiophenyl
(24) 4-Chlorophenyl
(25) 4-Benzoylphenyl
(26) 4-Acetoxyphenyl
(27) 4-Benzoyloxyphenyl
(28) 4-Phenoxycarbonylphenyl
(29) 4-Methoxyphenyl
(30) 4-Anilinophenyl
(31) 4-Isobutyrylaminophenyl
(32) 4-Phenoxycarbonylaminophenyl
(33) 4-(3-Ethylureido)phenyl
(34) 4-(3,3-Diethylureido)phenyl
(35) 4-Methylphenyl
(36) 4-Phenoxyphenyl
(37) 4-Hydroxyphenyl
(38) 3,4-Diethoxycarbonylphenyl
(39) 3,4-Dibutoxyphenyl
(40) 3,4-Diphenylphenyl
(41) 3,4-Diphenylthiophenyl
(42) 3,4-Dichlorophenyl
(43) 3,4-Dibenzoylphenyl
(44) 3,4-Diacetoxyphenyl
(45) 3,4-Dibenzoyloxyphenyl
(46) 3,4-Diphenoxycarbonylphenyl
(47) 3,4-Dimethoxyphenyl
(48) 3,4-Dianilinophenyl
(49) 3,4-Dimethylphenyl
(50) 3,4-Diphenoxyphenyl
(51) 3,4-Dihydroxyphenyl
(52) 2-Naphthyl
(53) 3,4,5-Triethoxycarbonylphenyl
(54) 3,4,5-Tributoxyphenyl
(55) 3,4,5-Triphenylphenyl
(56) 3,4,5-Triphenylthiophenyl
(57) 3,4,5-Trichlorophenyl
(58) 3,4,5-Tribenzoylphenyl
(59) 3,4,5-Triacetoxyphenyl
(60) 3,4,5-Tribenzoyloxyphenyl
(61) 3,4,5-Triphenoxycarbonylphenyl
(62) 3,4,5-Trimethoxyphenyl
(63) 3,4,5-Trianilinophenyl
(64) 3,4,5-Trimethylphenyl
(65) 3,4,5-Triphenoxyphenyl
(66) 3,4,5-Trihydroxyphenyl (67)~(132)

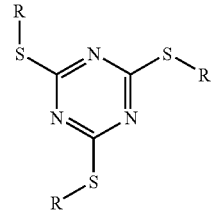

(67) Phenyl
(68) 3-Ethoxycarbonylphenyl
(69) 3-Butoxyphenyl
(70) m-Biphenyl
(71) 3-Phenylthiophenyl
(72) 3-Chlorophenyl
(73) 3-Benxoylphenyl
(74) 3-Acetoxyphenyl
(75) 3-Benzoyloxyphenyl
(76) 3-Phenoxycarbonylphenyl
(77) 3-Methoxyphenyl
(78) 3-Anilinophenyl
(79) 3-Isobutyrylaminophenyl
(80) 3-Phenoxycarbonylaminophenyl
(81) 3-(3-ethylureido)phenyl
(82) 3-(3,3-Diethylureido)phenyl
(83) 3-Methylphenyl
(84) 3-Phenoxyphenyl
(85) 3-Hydroxyphenyl
(86) 4-Ethoxycarbonylphenyl
(87) 4-Butoxyphenyl
(88) p-Biphenylyl
(89) 4-Phenylthiophenyl
(90) 4-Chlorophenyl
(91) 4-Benzoylphenyl
(92) 4-Acetoxyphenyl

(93) 4-Benzoyloxyphenyl
(94) 4-Phenoxycarbonylphenyl
(95) 4-Methoxyphenyl
(96) 4-Anilinophenyl
(97) 4-Isobutyrylarninophenyl
(98) 4-Phenoxycarbonylaminophenyl
(99) 4-(3-Ethylureido)phenyl
(100) 4-(3,3-Diethylureido)phenyl
(101) 4-Methylphenyl
(102) 4-Phenoxyphenyl
(103) 4-Hydroxyphenyl
(104) 3,4-Diethoxycarbonylphenyl
(105) 3,4-Dibutoxyphenyl
(106) 3,4-Diphenylphenyl
(107) 3,4-Diphenylthiophenyl
(108) 3,4-Dichlorophenyl
(109) 3,4-Dibenzoylphenyl
(110) 3,4-Diacetoxyphenyl
(111) 3,4-Dibenzoyloxyphenyl
(112) 3,4-Diphenoxycarbonylphenyl
(113) 3,4-Dimethoxyphenyl
(114) 3,4-Dianilinophenyl
(115) 3,4-Dimethylphenyl
(116) 3,4-Diphenoxyphenyl
(117) 3,4-Dihydroxyphenyl
(118) 2-Naphthyl
(119) 3,4,5-Triethoxycarbonylphenyl
(120) 3,4,5-Tributoxyphenyl
(121) 3,4,5-Triphenylphenyl
(122) 3,4,5-Triphenylthiophenyl
(123) 3,4,5-Trichlorophenyl
(124) 3,4,5-Tribenzoylphenyl
(125) 3,4,5-Triacetoxyphenyl
(126) 3,4,5-Tribenzoyloxyphenyl
(127) 3,4,5-Triphenoxycarbonylphenyl
(128) 3,4,5-Trimethoxyphenyl
(129) 3,4,5-Trianilinophenyl
(130) 3,4,5-Trimethylphenyl
(131) 3,4,5-Triphenoxyphenyl
(132) 3,4,5-Trihydroxyphenyl
 (133)~(330)

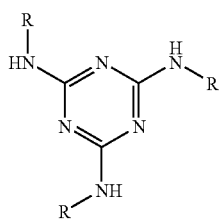

(133) Phenyl
(134) 4-Butylphenyl
(135) 4-(2-methoxy-2-ethoxyethyl)phenyl
(136) 4-(5-nonenyl)phenyl
(137) p-Biphenylyl
(138) 4-Ethoxycarbonylphenyl
(139) 4-Butoxyphenyl
(140) 4-Methylphenyl
(141) 4-Chlorophenyl
(142) 4-Phenylthiophenyl
(143) 4-Benzoylphenyl
(144) 4-Acetoxyphenyl
(145) 4-Benzoyloxyphenyl
(146) 4-Phenoxycarbonylphenyl
(147) 4-Methoxyphenyl
(148) 4-Anilinophenyl
(149) 4-Isobutyrylaminophenyl
(150) 4-Phenoxycarbonylaminophenyl
(151) 4-(3-Ethylureido)phenyl
(152) 4-(3,3-Diethylureido)phenyl
(153) 4-Phenoxyphenyl
(154) 4-Hydroxyphenyl
(155) 3-Butylphenyl
(156) 3-(2-Methoxy-2-ethoxyethyl)phenyl
(157) 3-(5-Nonenyl)phenyl
(158) m-Biphenylyl
(159) 3-Ethoxycarbonylphenyl
(160) 3-Butoxyphenyl
(161) 3-Methylphenyl
(162) 3-Chlorophenyl
(163) 3-Phenylthiophenyl
(164) 3-Benzoylphenyl
(165) 3-Acetoxyphenyl
(166) 3-Benzoyloxyphenyl
(167) 3-Phenoxycarbonylphenyl
(168) 3-Methoxyphenyl
(169) 3-Anilinophenyl
(170) 3-Isobutyrylaminophenyl
(171) 3-Phenoxycarbonylaminophenyl
(172) 3-(3-Ethylureido)phenyl
(173) 3-(3,3-Diethylureido)phenyl
(174) 3-Phenoxyphenyl
(175) 3-Hydroxyphenyl
(176) 2-Butylphenyl
(177) 2-(2-Methoxy-2-ethoxyethyl)phenyl
(178) 2-(5-Nonenyl)phenyl
(179) o-Biphenylyl
(180) 2-Ethoxycarbonylphenyl
(181) 2-Butoxyphenyl
(182) 2-Methylphenyl
(183) 2-Chlorophenyl
(184) 2-Phenylthiophenyl
(185) 2-Benzoylphenyl
(186) 2-Acetoxyphenyl
(187) 2-Benzoyloxyphenyl
(188) 2-Phenoxycarbonylphenyl
(189) 2-Methoxyphenyl
(190) 2-Anilinophenyl
(191) 2-Isobutyrylaminophenyl
(192) 2-Phenoxycarbonylaminophenyl
(193) 2-(3-Ethylureido)phenyl
(194) 2-(3,3-Diethylureido)phenyl
(195) 2-Phenoxyphenyl
(196) 2-Hydroxyphenyl
(197) 3,4-Dibutylphenyl
(198) 3,4-Di(2-methoxy-2-ethoxyethyl)phenyl
(199) 3,4-Diphenylphenyl
(200) 3,4-Diethoxycarbonylphenyl
(201) 3,4-Didodecyloxyphenyl
(202) 3,4-Dimetylphenyl
(203) 3,4-Dichlorophenyl
(204) 3,4-Dibenzoylphenyl
(205) 3,4-Diacetoxyphenyl
(206) 3,4-Dimethoxyphenyl
(207) 3,4-Di-N-methylaminophenyl
(208) 3,4-Diisobutyrylaminophenyl
(209) 3,4-Diphenoxyphenyl
(210) 3,4-Dihydroxyphenyl
(211) 3,5-Dibutylphenyl (212) 3,5-Di(2-methoxy-2-ethoxyethyl)phenyl
(213) 3,5-Diphenylphenyl
(214) 3,5-Diethoxycarbonylphenyl
(215) 3,5-Didodecyloxyphenyl
(216) 3,5-Dimetylphenyl
(217) 3,5-Dichlorophenyl
(218) 3,5-Dibenzoylphenyl
(219) 3,5-Diacetoxyphenyl
(220) 3,5-Dimethoxyphenyl
(221) 3,5-Di-N-methylaminophenyl
(222) 3,5-Diisobutyrylaminophenyl
(223) 3,5-Diphenoxyphenyl
(224) 3,5-Dihydroxyphenyl
(225) 2,4-Dibutylphenyl
(226) 2,4-Di(2-methoxy-2-ethoxyethyl)phenyl
(227) 2,4-Diphenylphenyl
(228) 2,4-Diethoxycarbonylphenyl
(229) 2,4-Didodecyloxyphenyl
(230) 2,4-Dimetylphenyl
(231) 2,4-Dichlorophenyl
(232) 2,4-Dibenzoylphenyl
(233) 2,4-Diacetoxyphenyl
(234) 2,4-Dimethoxyphenyl
(235) 2,4-Di-N-methylaminophenyl
(236) 2,4-Diisobutyrylaminophenyl
(237) 2,4-Diphenoxyphenyl
(238) 2,4-Dihydroxyphenyl
(239) 2,3-Dibutylphenyl
(240) 2,3-Di(2-methoxy-2-ethoxyethyl)phenyl
(241) 2,3-Diphenylphenyl
(242) 2,3-Diethoxycarbonylphenyl
(243) 2,3-Didodecyloxyphenyl
(244) 2,3-Dimetylphenyl
(245) 2,3-Dichlorophenyl
(246) 2,3-Dibenzoylphenyl
(247) 2,3-Diacetoxyphenyl
(248) 2,3-Dimethoxyphenyl
(249) 2,3-Di-N-methylaminophenyl
(250) 2,3-Diisobutyrylaminophenyl
(251) 2,3-Diphenoxyphenyl
(252) 2,3-Dihydroxyphenyl
(253) 2,6-Dibutylphenyl
(254) 2,6-Di(2-methoxy-2-ethoxyethyl)phenyl
(255) 2,6-Diphenylphenyl
(256) 2,6-Diethoxycarbonylphenyl
(257) 2,6-Didodecyloxyphenyl
(258) 2,6-Dimetylphenyl
(259) 2,6-Dichlorophenyl
(260) 2,6-Dibenzoylphenyl
(261) 2,6-Diacetoxyphenyl
(262) 2,6-Dimethoxyphenyl
(263) 2,6-Di-N-methylaminophenyl
(264) 2,6-Diisobutyrylaminophenyl
(265) 2,6-Diphenoxyphenyl
(266) 2,6-Dihydroxyphenyl
(267) 3,4,5-Tributylphenyl
(268) 3,4,5-Tri(2-methoxy-2-ethoxyethyl)phenyl
(269) 3,4,5-Triphenylphenyl
(270) 3,4,5-Triethoxycarbonylphenyl
(271) 3,4,5-Tridodecyloxyphenyl
(272) 3,4,5-Trimethylphenyl
(273) 3,4,5-Trichlorophenyl
(274) 3,4,5-Tribenzoylphenyl
(275) 3,4,5-Triacetoxyphenyl
(276) 3,4,5-Trimethoxyphenyl
(277) 3,4,5-Tri-N-methylaminophenyl
(278) 3,4,5-Triisobutyrylaminophenyl
(279) 3,4,5-Triphenoxyphenyl
(280) 3,4,5-Trihydroxyphenyl
(281) 2,4,6-Tributylphenyl
(282) 2,4,6-Tri(2-methoxy-2-ethoxyethyl)phenyl
(283) 2,4,6-Triphenylphenyl
(284) 2,4,6-Triethoxycarbonylphenyl
(285) 2,4,6-Tridodecyloxyphenyl
(286) 2,4,6-Trimethylphenyl
(287) 2,4,6-Trichlorophenyl
(288) 2,4,6-Tribenzoylphenyl
(289) 2,4,6-Triacetoxyphenyl
(290) 2,4,6-Trimethoxyphenyl
(291) 2,4,6-Tri-N-methylaminophenyl
(292) 2,4,6-Triisobutyrylaminophenyl
(293) 2,4,6-Triphenoxyphenyl
(294) 2,4,6-Trihydroxyphenyl
(295) Pentafluorophenyl
(296) Pentachlorophenyl
(297) Pentamethoxyphenyl
(298) 6-N-Methylsulfamoyl-8-methoxy-2-naphthyl
(299) 5-N-Methylsulfamoyl-2-naphthyl
(300) 6-N-Phenylsulfamoyl-2-naphthyl
(301) 5-Ethoxy-7-N-methylslfamoyl-2-naphthyl
(302) 3-Methoxy-2-naphthyl
(303) 1-Ethoxy-2-naphthyl
(304) 6-N-Phenylsulfamoyl-8-methoxy-2-naphthyl
(305) 5-Methoxy-7-N-phenylsulfamoyl-2-naphthyl
(306) 1-(4-Methylphenyl)-2-naphthyl
(307) 6,8-Di-N-methylsulfamoyl-2-naphthyl
(308) 6-N-2-Acetoxyethylsulfamoyl-8-methoxy-2-naphthyl
(309) 5-Acetoxy-7-N-phenylsulfamoyl-2-naphthyl
(310) 3-Benzoyloxy-2-naphthyl
(311) 5-Acetylamino-1-naphthyl
(312) 2-Methoxy-1-naphthyl
(313) 4-Phenoxy-1-naphthyl
(314) 5-N-Methylsulfamoyl-1-naphthyl
(315) 3-N-Methylcarbamoyl-4-hydroxy-1-naphthyl
(316) 5-Methoxy-6-N-ethylsulfamoyl-1-naphthyl
(317) 7-Tetradecyloxy-1-naphthyl
(318) 4-(4-Methylphenoxy)-1-naphthyl
(319) 6-N-Methylsulfamoyl-1-naphthyl
(320) 3-N,N-Dimethylcarbamoyl-4-methoxy-1-naphthyl
(321) 5-Methoxy-6-N-benzylsulfamoyl-1-naphthyl
(322) 3,6-Di-N-phenylsulfamoyl-1-naphthyl
(323) Methyl
(324) Ethyl
(325) Butyl
(326) Octyl
(327) Dodecyl
(328) 2-butoxy-2-ethoxythyl
(329) benzyl
(330) 4-methoxybenzyl (331)~(333)

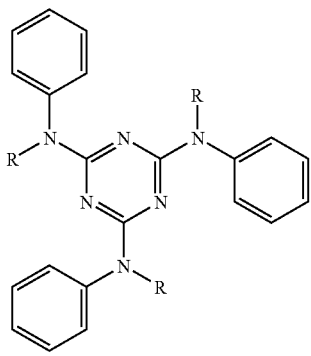

(331) methyl
(332) phenyl
(333) buthyl

In the invention, retardation increasing agents comprising the discotic compounds represented by the following formula (II) can also be preferably used.

The compounds represented by the formula (II) will be described below.

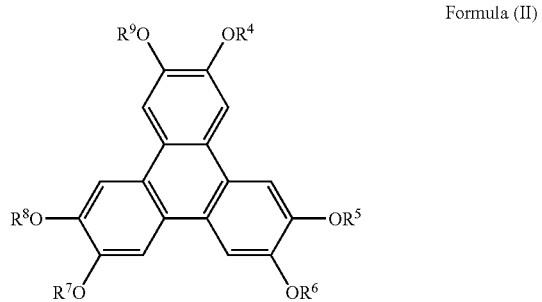

Formula (II)

In the formula (II), $R^4$, $R^5$, $R^6$, $R^7$, $R^8$ and $R^9$ each independently represents a hydrogen atom or a substituent. Substituents represented by $R^4$, $R^5$, $R^6$, $R^7$, $R^8$ and $R^9$ include an alkyl group (containing preferably from 1 to 40 carbon atoms, more preferably from 1 to 30 carbon atoms, particularly preferably from 1 to 20 carbon atoms; e.g., a methyl group, an ethyl group, an isopropyl group, a tert-butyl group, a n-octyl group, a n-decyl group, a n-hexadecyl group, a cyclopropyl group, a cyclopentyl group or a cyclohexyl group), an alkenyl group (containing preferably from 2 to 40 carbon atoms, preferably from 2 to 20 carbon atoms; e.g., a vinyl group, an allyl group, a 2-butenyl group or a 3-pentenyl group), an alkynyl group (containing preferably from 2 to 40 carbon atoms, more preferably from 2 to 30 carbon atoms, particularly preferably from 2 to 20 carbon atoms; e.g., a propargyl group or a 3-pentynyl group), an aryl group (containing preferably from 6 to 30 carbon atoms, more preferably from 6 to 20 carbon atoms, particularly preferably from 6 to 12 carbon atoms; e.g., a phenyl group, a p-methylphenyl group or a naphthyl group), a substituted or unsubstituted amino group (containing preferably from 0 to 40 carbon atoms, more preferably from 0 to 30 carbon atoms, particularly preferably from 0 to 20 carbon atoms; e.g., an unsubstituted amino group, a methylamino group, a dimethylamino group, a diethylamino group or an anilino group); an alkoxy group (containing preferably from 1 to 40 carbon atoms, more preferably from 1 to 30 carbon atoms, particularly preferably from 1 to 20 carbon atoms; e.g., a methoxy group, an ethoxy group or a butoxy group), an aryloxy group (containing preferably from 6 to 40 carbon atoms, more preferably from 6 to 30 carbon atoms, particularly preferably from 6 to 20 carbon atoms; e.g., a phenyloxy group or a 2-naphthyloxy group), an acyl group (containing preferably from 1 to 40 carbon atoms, more preferably from 1 to 30 carbon atoms, particularly preferably from 1 to 20 carbon atoms; e.g., an acetyl group, a benzoyl group, a formyl group or a pivaloyl group); an alkoxycarbonyl group (containing preferably from 2 to 40 carbon atoms, more preferably from 2 to 30 carbon atoms, particularly preferably from 2 to 20 carbon atoms; e.g., a methoxycarbonyl group or an ethoxycarbonyl group), an aryloxycarbonyl group (containing preferably from 7 to 40 carbon atoms, more preferably from 7 to 30 carbon atoms, particularly preferably from 7 to 20 carbon atoms; e.g., a phenyloxycarbonyl group), an acyloxy group (containing preferably from 2 to 40 carbon atoms, more preferably from 2 to 30 carbon atoms, particularly preferably from 2 to 20 carbon atoms; e.g., an acetoxy group or a benzoyloxy group); an acylamino group (containing preferably from 2 to 40 carbon atoms, more preferably from 2 to 30 carbon atoms, particularly preferably from 2 to 20 carbon atoms; e.g., an acetylamino group or a benzoylamino group), an alkoxycarbonylamino group (containing preferably from 2 to 40 carbon atoms, more preferably from 2 to 30 carbon atoms, particularly preferably from 2 to 20 carbon atoms; e.g., a methoxycarbonylamino group), an aryloxycarbonylamino group (containing preferably from 7 to 40 carbon atoms, more preferably from 7 to 30 carbon atoms, particularly preferably from 7 to 20 carbon atoms; e.g., a phenyloxycarbonylamino group), a sulfonylamino group (containing preferably from 1 to 40 carbon atoms, more preferably from 1 to 30 carbon atoms, particularly preferably from 1 to 20 carbon atoms; e.g., a methanesulfonylamino group or a benzenesulfonylamino group), a sulfamoyl group (containing preferably from 0 to 40 carbon atoms, more preferably from 0 to 30 carbon atoms, particularly preferably from 0 to 20 carbon atoms; e.g., a sulfamoyl group, a methylsulfamoyl group, a dimethylsulfamoyl group or a phenylsulfamoyl group), a carbamoyl group (containing preferably from 1 to 40 carbon atoms, more preferably from 1 to 30 carbon atoms, particularly preferably from 1 to 20 carbon atoms; e.g., an unsubstituted carbamoyl group, a methylcarbamoyl group, a diethylcarbamoyl group or a phenylcarbamoyl group); an alkylthio group (containing preferably from 1 to 40 carbon atoms, more preferably from 1 to 30 carbon atoms, particularly preferably from 1 to 20 carbon atoms; e.g., a phenylthio group), a sulfonyl group (containing preferably from 1 to 40 carbon atoms, more preferably from 1 to 30 carbon atoms, particularly preferably from 1 to 20 carbon atoms; e.g., a mesyl group or a tosyl group), a sulfinyl group (containing preferably from 1 to 40 carbon atoms, more preferably from 1 to 30 carbon atoms, particularly preferably from 1 to 20 carbon atoms; e.g., a methanesulfinyl group or a benzenesulfinyl group), a ureido group (containing preferably from 1 to 40 carbon atoms, more preferably from 1 to 30 carbon atoms, particularly preferably from 1 to 20 carbon atoms; e.g., an unsubstituted ureido group, a methylureido group or a phenylureido group), a phosphoric acid amido group (containing preferably from 1 to 40 carbon atoms, more preferably from 1 to 30 carbon atoms, particularly preferably from 1 to 20 carbon atoms; e.g., adiethylphosphoric acid amido group or a phenylphosphoric acid amido group), a hydroxyl group, a mercapto group, a halogen atom (e.g., a fluorine atom, a chlorine atom, a bromine atom or an iodine atom), a cyano group, a sulfo group, a carboxyl group, a nitro group, a hydroxamic acid group, a sulfino group, a hydrazino group, an imino group, a hetero ring group (containing preferably from 1 to 30 carbon atoms, more preferably from 1 to 12 carbon atoms, e.g., a hetero ring group having a hetero atom such as a nitrogen atom, an oxygen atom or a sulfur atom exemplified by an imidazolyl group, a pyridyl group, a quinolyl group, a furyl group, a piperidyl group, a morpholino group, a benzoxazolyl group, a benzimidazolyl group, a benzothiazolyl group or a 1,3,5-triazyl group) and a silyl group (containing preferably from 3 to 40 carbon atoms, more preferably from 3 to 30 carbon atoms, particularly preferably from 3 to 24 carbon atoms; e.g., a trimethylsilyl group or a triphenylsilyl group). These substituents may further be substituted by these substituents. In the case where two or more substituents exist, they may be the same or different from each other. If possible, they may be connected to each other to form a ring.

Substituents represented by $R^4$, $R^5$, $R^6$, $R^7$, $R^8$ and $R^9$ are preferably an alkyl group, an aryl group, a substituted or unsubstituted amino group, an alkoxy group, an alkylthio group or a halogen atom.

Specific examples of the compounds represented by the formula (II) are illustrated below which, however, are not limitative at all.

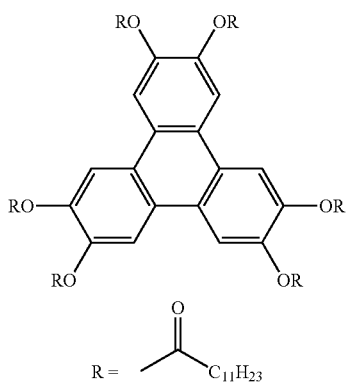

III-1

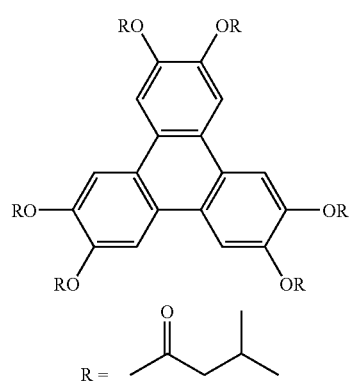

III-2

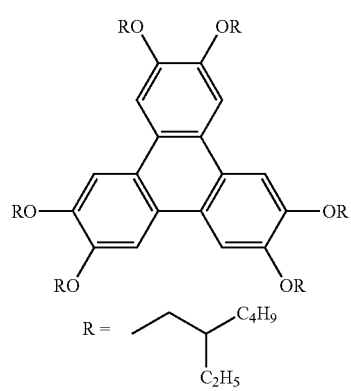

-continued

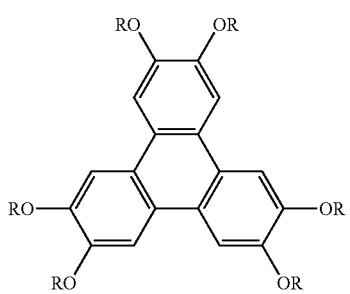

III-3

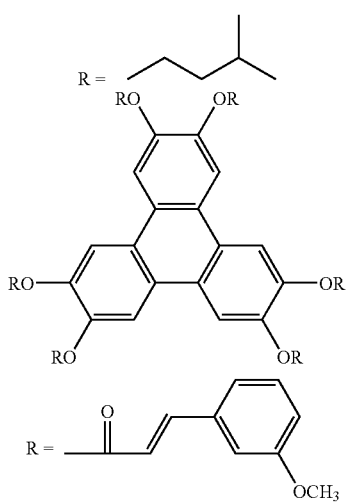

III-4

III-5

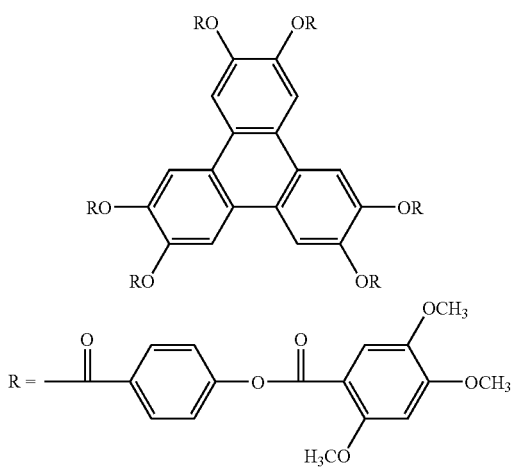

III-6

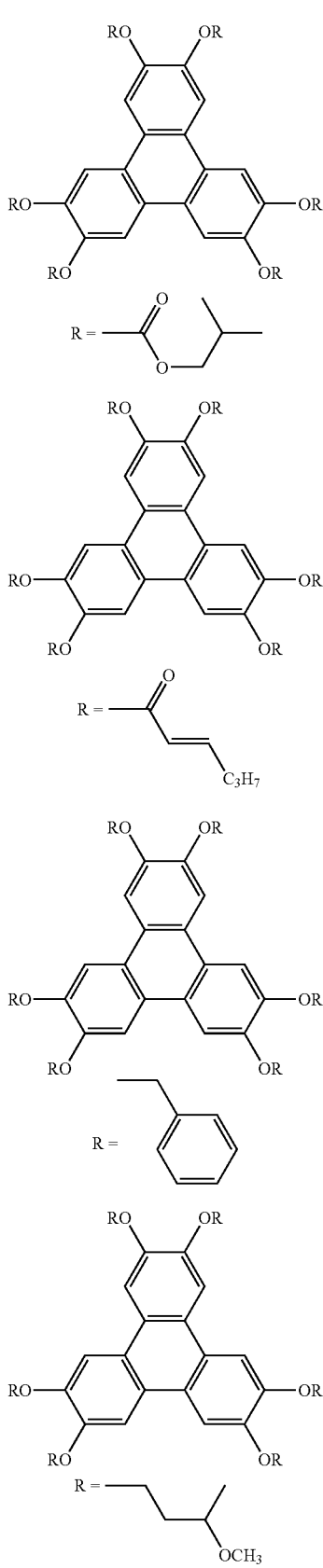

III-7

III-8

III-9

III-10

The retardation increasing agent represented by formula (1) or (II) is used in an amount of preferably from 0.01 to 20 parts by weight, more preferably from 0.5 to 10 parts by weight, per 100 parts by weight of the polymer component. When the retardation increasing agent of formula (1) is used in the above amount range, it is possible to appropriately control retardation of the film.

(Rod-shaped Compound)

A rod-shaped compound as well as the above-described discotic compound can be used to advantage.

In view of functions of a retardation increasing agent, the rod-shaped compound has preferably at least one aromatic ring, more preferably at least two aromatic rings.

The rod-shaped compound preferably has a linear molecular structure. The term "linear molecular structure" means that the molecular structure of a rod-shaped compound in thermodynamically most stable conformation is linear. The thermodynamically most stable conformation can be determined by crystal structure analysis or molecular orbital calculation. For instance, the molecular orbital calculations can be made using a software program for molecular orbital calculations (e.g., WinMOPAC2000, produced by Fujitsu) and thereby the molecular structure capable of minimizing the heat for forming the intended compound can be determined. The expression "the molecular structure is linear" means that the main chain of molecular structure in the thermodynamically most stable conformation forms an angle of 140 degrees or above.

As a rod-shaped compound having at least two aromatic rings, those represented by the following formula (I') are suitable.

$$Ar^1\text{-}L^1\text{-}Ar^2 \qquad \text{Formula (I')}$$

In the above formula (I'), $Ar^1$ and $Ar^2$ each represent an aromatic group independently.

The term "aromatic group" as used herein is intended to include aryl groups (aromatic hydrocarbon groups), substituted aryl groups, aromatic heterocyclic groups and substituted aromatic heterocyclic groups. Aryl groups and substituted aryl groups are preferable to aromatic heterocyclic groups and substituted aromatic heterocyclic groups. The heterocyclic rings of aromatic heterocyclic groups are generally unsaturated rings, and they are preferably 5-, 6- or 7-membered rings, far preferably 5- or 6-membered rings. The aromatic heterocyclic rings each generally have the greatest possible number of double bonds. The hetero-atom containable therein is preferably a nitrogen, oxygen or sulfur atom, far preferably a nitrogen or sulfur atom. Examples of the aromatic heterocyclic include a benzene ring, a furan ring, a thiophene ring, a pyrrole ring, an oxazole ring, an isooxazole ring, a thiazole ring, an isothiazole ring, an imidazole ring, a pyrazole ring, a furazan ring, a trizole ring, a pyrane ring, a pyridine ring, a pyridazine ring, a pyrimidine ring, a pyrazine ring and a 1,3,5-triazine ring. Examples of the aromatic ring in an aromatic group include a benzene ring, a furan ring, a thiophene ring, a pyrrole ring, an oxazole ring, a thiazole ring, an imidazole ring, a trizole ring, a pyridine ring, a pyrimidine ring and a pyrazine ring, and of these rings, a benzene ring is preferred over the others.

Examples of substituents present in the substituted aryl group and the substituted aromatic heterocyclic group include halogen atoms (F, Cl, Br, I), a hydroxyl group, a carboxyl group, a cyano group, an amino group, alkylamino groups (e.g., methylamino, ethylamino, butylamino, dimethylamino), a nitro group, a sulfo group, a carbamoyl group, alkylcarbamoyl groups (e.g., N-methylcarbamoyl, N-ethylcarbamoyl, N,N-dimethylcarbamoyl), a sulfamoyl group, alkylsulfamoyl groups (e.g., N-methylsulfamoyl, N-ethylsulfamoyl, N,N-dimethylsulfamoyl), an ureido group, alkylureido groups (e.g., N-methylureido, N,N-dimethylureido, N,N,N'-trimethylureido), alkyl groups (e.g., methyl, ethyl, propyl, butyl, pentyl, heptyl, octyl, isopropyl, s-butyl, t-amyl, cyclohexyl, cyclopentyl), alkenyl groups (e.g., vinyl, allyl, hexenyl), alkynyl groups (e.g., ethynyl, butynyl), acyl groups (e.g., formyl, acetyl, butyryl, hexanoyl, lauryl), acyloxy groups (e.g., acetoxy, butryloxy, hexanoyloxy, lauryloxy), alkoxy groups (e.g., methoxy, ethoxy, propoxy, butoxy, pentyloxy, heptyloxy, octyloxy), aryloxy groups (e.g., phenoxy), alkoxycarbonyl groups (e.g., methoxycarbonyl, ethoxycarbonyl, propoxycarbonyl, butoxycarbonyl, pentyloxycarbonyl, heptyloxycarbonyl), aryloxycarbonyl groups (e.g., phenoxycarbonyl), alkoxycarbonylamino groups (e.g., butoxycarbonylamino, hexyloxycarbonylamino), alkylthio groups (e.g., methylthio, ethylthio, propylthio, butylthio, pentylthio, heptylthio, octylthio), arylthio groups (e.g., phenylthio), alkylsulfonyl groups (e.g., methylsulfonyl, ethylsulfonyl, propylsulfonyl, butylsulfonyl, pentylsulfonyl, heptylsulfonyl, octylsulfonyl), amido groups (e.g., acetamido, butylamido, hexylamido, laurylamido), and non-aromatic heterocyclic groups (e.g., morpholino, pyrazinyl).

As substituents in the substituted aryl group and the substituted aromatic heterocyclic group, halogen atoms, a cyano group, a carboxyl group, a hydroxyl group, an amino group, alkylamino groups, acyl groups, acyloxy groups, amido groups, alkoxycarbonyl groups, alkoxy groups, alkylthio groups and alkyl groups are preferred over the others. The alkyl moieties of alkylamino, alkoxycarbonyl, alkoxy and alkylthio groups and the alkyl groups may further have substituents. Examples of substituents the alkyl moieties and alkyl groups may have include halogen atoms, a hydroxyl group, a carboxyl group, a cyano group, an amino group, alkylamino groups, a nitro group, a sulfo group, a carbamoyl group, alkylcarbamoyl groups, a sulfamoyl group, alkylsulfamoyl groups, a ureido group, alkylureido groups, alkenyl groups, alkynyl groups, acyl groups, acyloxy groups, alkoxy groups, aryloxy groups, alkoxycarbonyl groups, aryloxycarbonyl groups, alkoxycarbonylamino groups, alkylthio groups, arylthio groups, alkylsulfonyl groups, amido groups and non-aromatic heterocyclic groups. Of these substituents, halogen atoms, a hydroxyl group, an amino group, alkylamino groups, acyl groups, acyloxy groups, acylamino groups, alkoxycarbonyl groups and alkoxy groups are preferred over the others.

In formula (I'), $L^1$ is a divalent linkage group selected from alkylene groups, alkenylene groups, alkynylene groups, —O—, —CO— or combinations of two or more of those groups. The alkylene groups may have cyclic structures. As cycloalkylene groups, cyclohexylene groups, especially 1,4-cyclohexylene, are suitable. As to open-chain alkylene groups, straight-chain alkylene groups are preferable to branched-chain alkylene groups. The number of carbon atoms in such an alkylene group is preferably from 1 to 20, far preferably from 1 to 15, further preferably from 1 to 10, furthermore preferably from 1 to 8, especially preferably from 1 to 6.

The alkenylene and alkynylene groups having open-chain structures are preferable to those having cyclic structures, and further the alkenylene and alkynylene groups having straight-chain structures are preferable to those having branched-chain structures. It is appropriate that the number of carbon atoms in such an alkenylene group and that in such an alkynylene group be each from 2 to 10, preferably from 2 to 8, far preferably from 2 to 6, further preferably from 2 to 4, especially preferably 2 (vinylene and ethynylene).

Examples of a divalent linking group comprising a combination are shown below.

L-1: —O—CO-alkylene group-CO—O—
L-2: —CO—O-alkylene group-O—CO—
L-3: —O—CO-alkenylene group-CO—O—
L-4: —CO—O-alkenylene group-O—CO—
L-5: —O—CO-alkynylene group-CO—O—
L-6: —CO—O-alkynylene group-O—CO—

In the molecular structure of formula (I'), the angle that $Ar^1$ forms with $Ar^2$ in a state that they face each other across $L^1$ is preferably at least 140 degrees. As the rod-shaped compound, compounds represented by formula (II) are more suitable.

$$Ar^1\text{-}L^2\text{-}X\text{-}L^3\text{-}Ar^2 \qquad \text{Formula (II)}$$

In the above formula (II), $Ar^1$ and $Ar^2$ are aromatic groups independently. The definition and examples of the aromatic groups as $Ar^1$ and $Ar^2$ are the same as those in formula (I').

In formula (II), $L^2$ and $L^3$ each represent a divalent linkage group selected from an alkylene group, —O—, —CO— or a combination of two or more thereof. As to the alkylene group, an alkylene group having an open-chain structure is preferable to an alkylene group having a cyclic structure, and further a straight-chain alkylene group is preferable to a branched-chain alkylene group. The number of carbon atoms in such an alkylene group is preferably from 1 to 10, far preferably from 1 to 8, further preferably from 1 to 6, and especially preferably from 1 to 4. However, the best number is 1 or 2 (corresponding to methylene or ethylene). As $L^2$ and $L^3$ each, —O—CO— or —CO—O— is most suitable.

In formula (II), X is a 1,4-cyclohexylene, vinylene or ethynylene group. Examples of a compound represented by formula (I') are illustrated below.

(1)

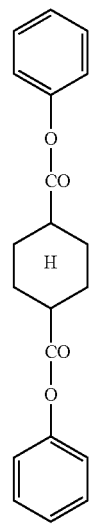

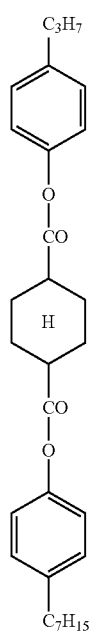
(2)
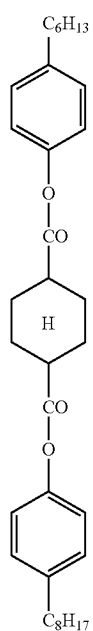
(3)
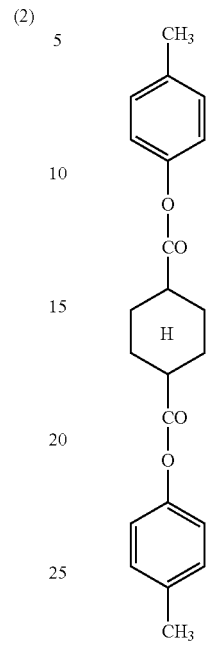
(4)
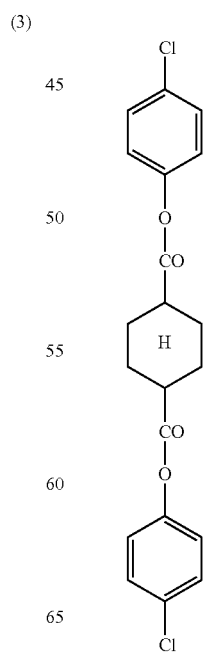
(5)

 (6)
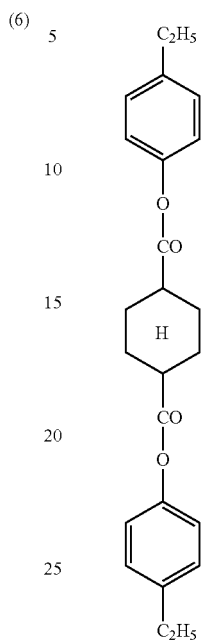 (8)
 (7)
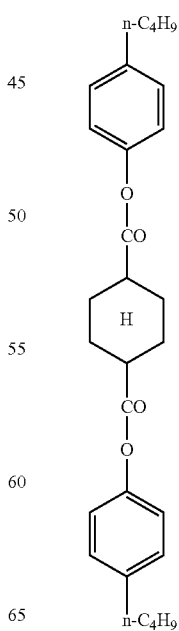 (9)

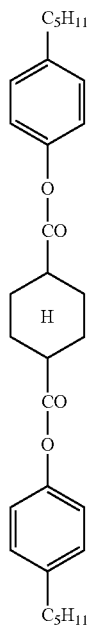
(10)
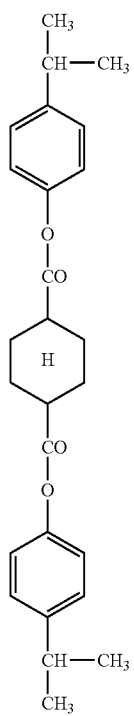
(11)
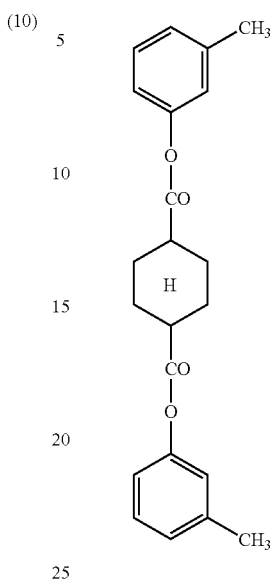
(12)
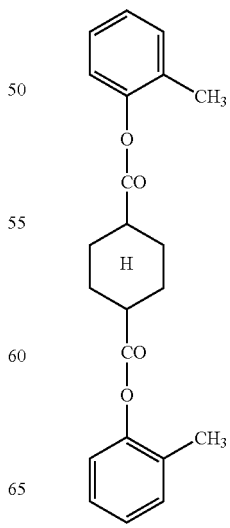
(13)

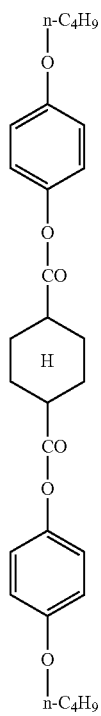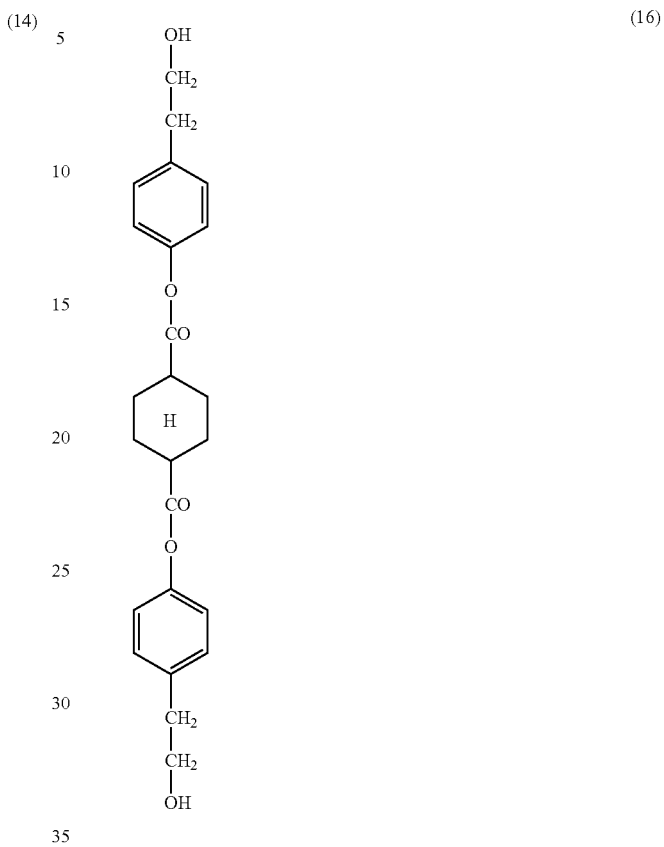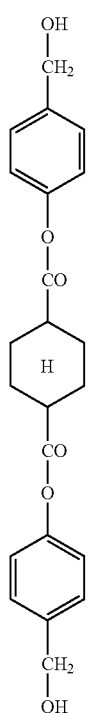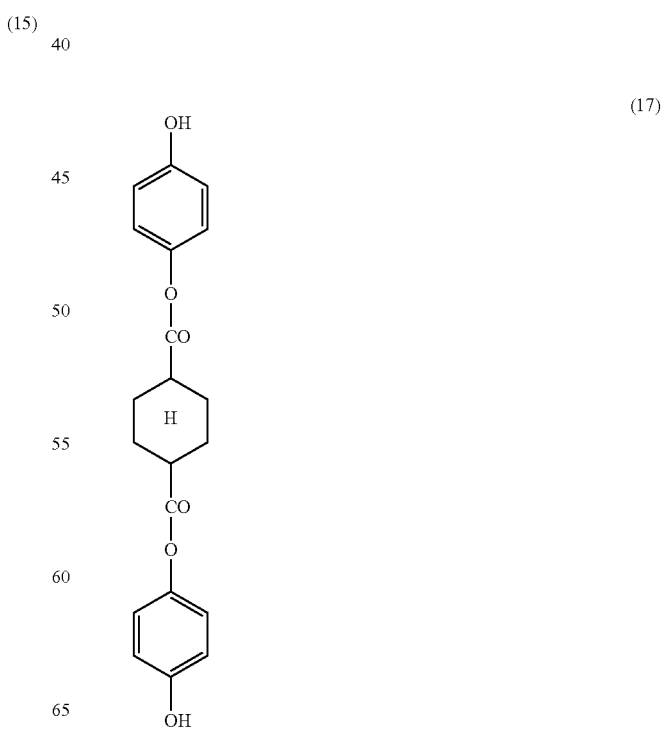

(18)
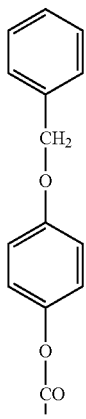
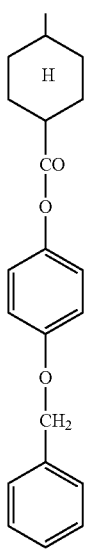
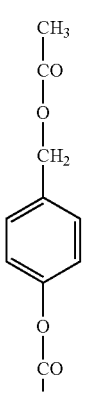
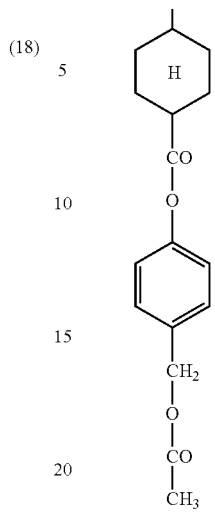
(18)
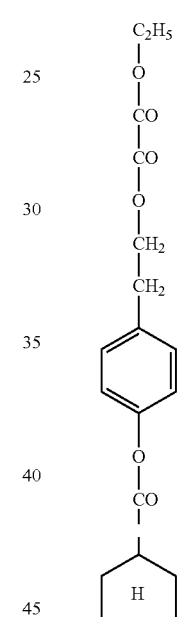
(19)
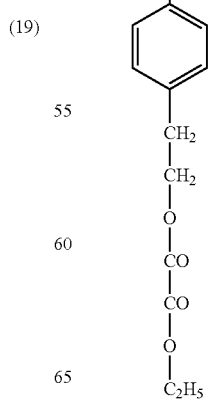
(20)

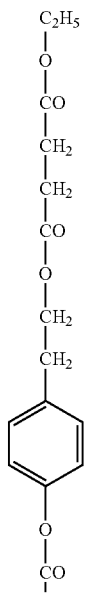
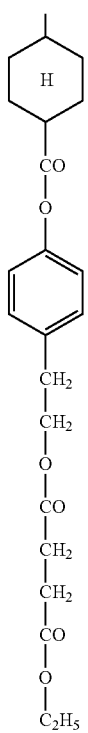
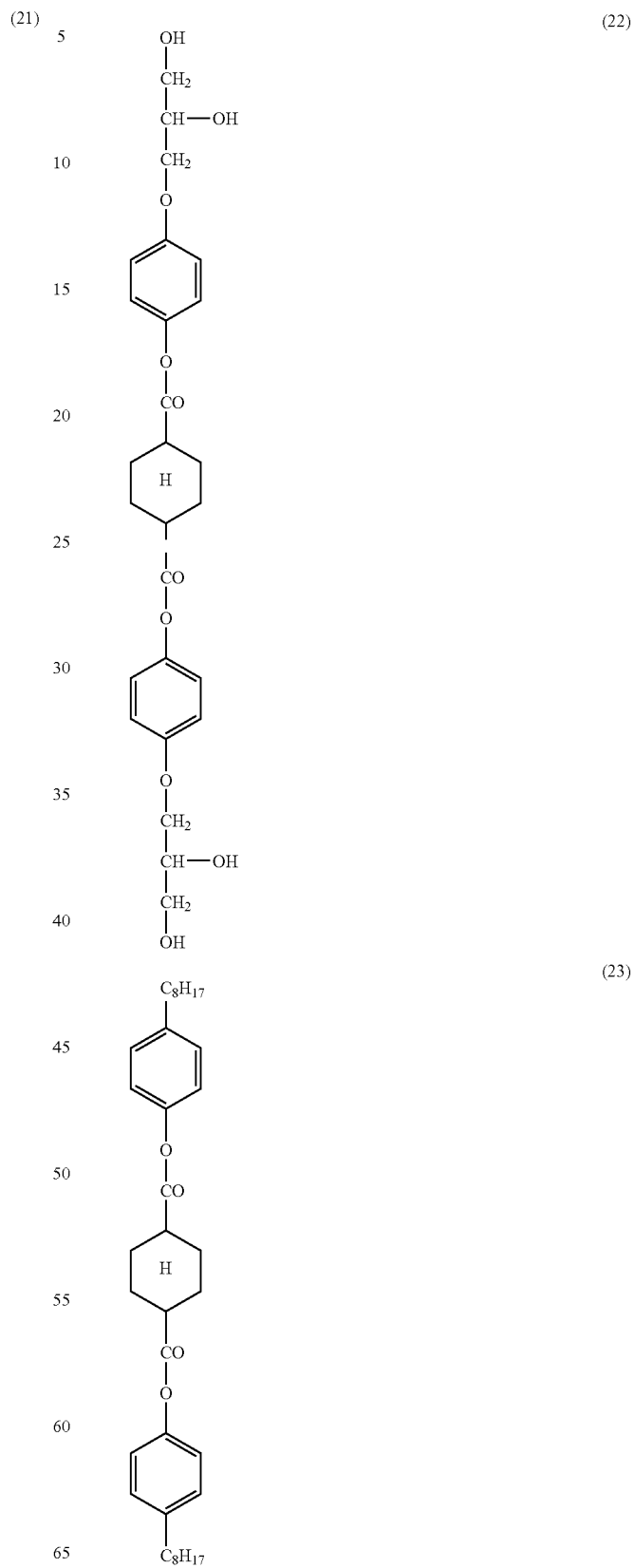

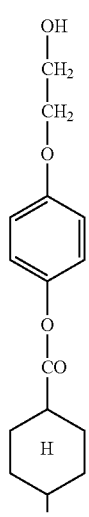
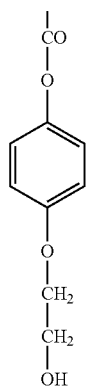
(24)
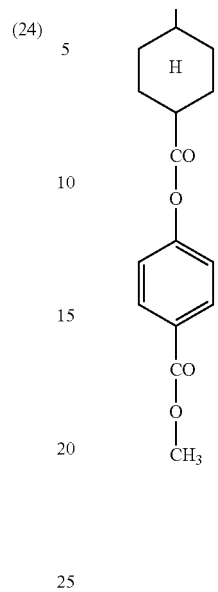
(26)
(25)
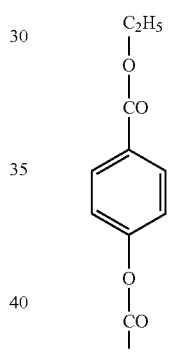
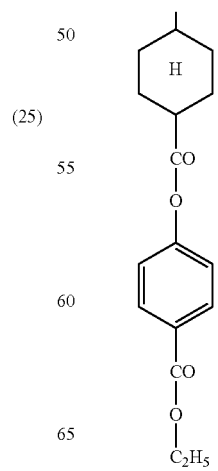

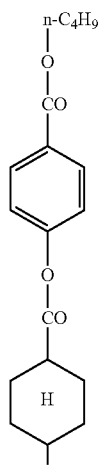
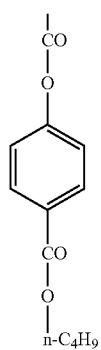
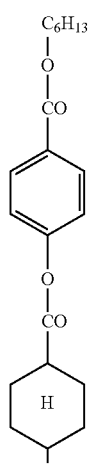
(27)
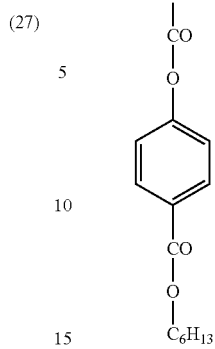
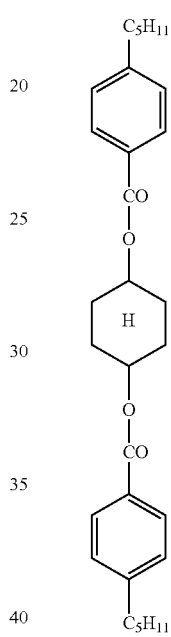
(28)
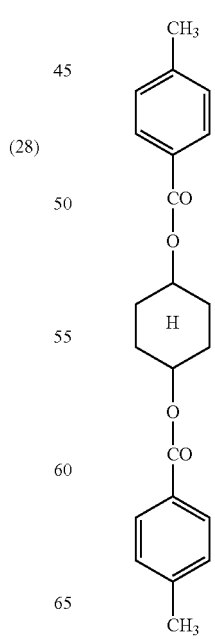
(29)
(30)

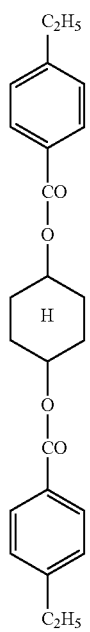 (31)
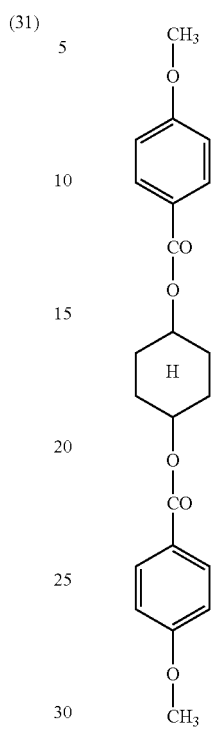 (33)
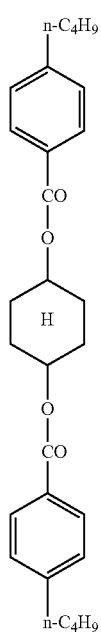 (32)
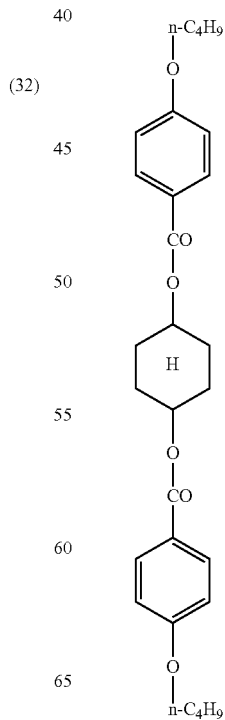 (34)

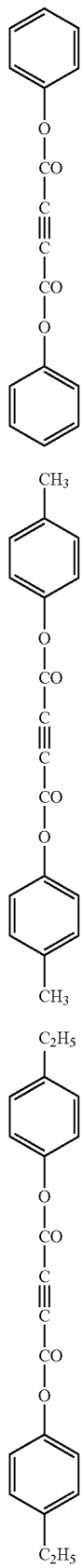
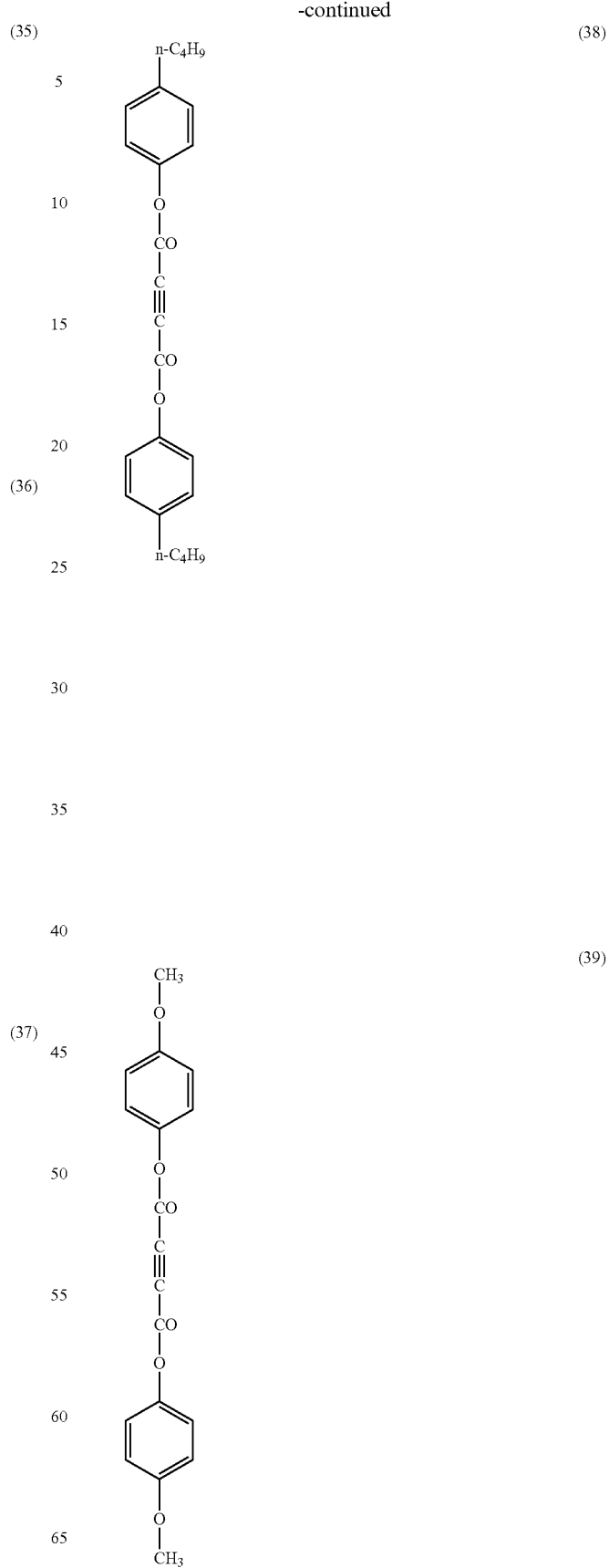

-continued
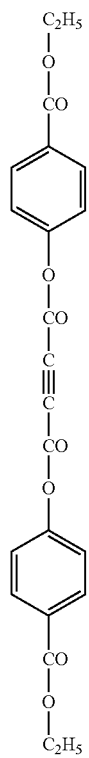
(40)
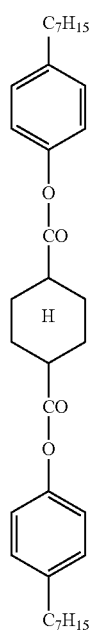
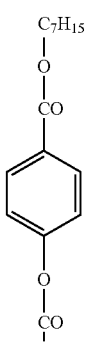
(42)
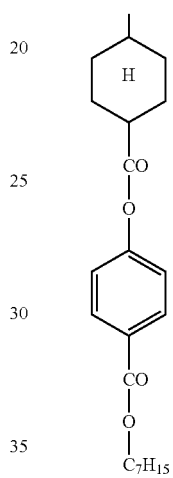
(41)
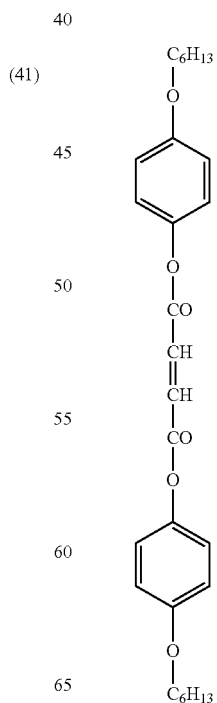
(43)

-continued

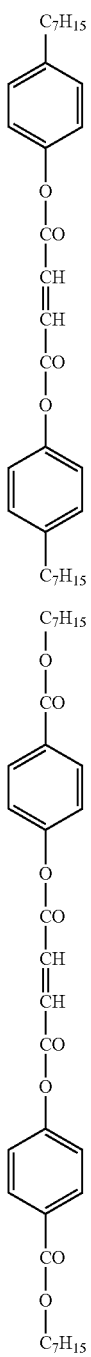

Exemplified Compounds (1) to (34), (41) and (42) each have two asymmetric carbon atoms at the 1- and 4-positions of the cyclohexane ring. However, the exemplified Compounds (1), (4) to (34), (41) and (42) have symmetric meso-form molecular structures, so none of them have optical isomers (optical activity) but each has only geometric isomers (trans-form and cis-form). The trans-form (1-trans) Exemplified Compound (1) and the cis-form (1-cis) Exemplified Compound (1) are illustrated below.

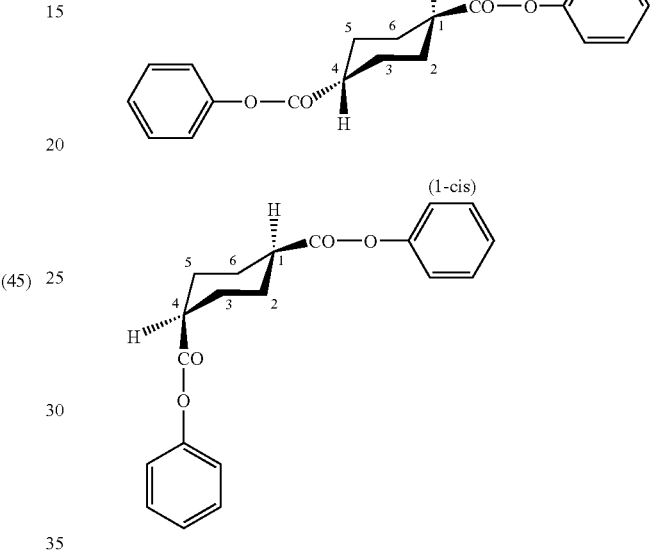

As mentioned above, it is preferable that rod-shaped compounds for use in the invention have linear structures. Therefore, the trans-form compounds are preferable to the cis-form compounds.

The exemplified Compounds (2) and (3) each have optical isomers in addition to geometric isomers (a total of 4 isomers). As to the geometric isomers also, the trans-form is preferable to the cis-form as mentioned above. As to the optical isomers, however, it is not worth to mention that one is better than the other. So they may have any of dextro (D), levo (L) and racemic forms.

In each of the exemplified Compounds (43) to (45), the vinylene linkage at the center, though may have either trans or cis form, preferably has the trans form for the same reason as mentioned above.

Other exemplified compounds are illustrated below.

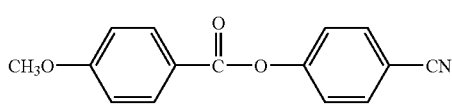

(46)

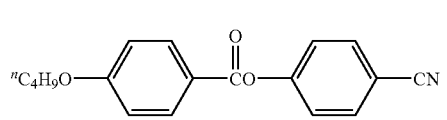

(47)

-continued
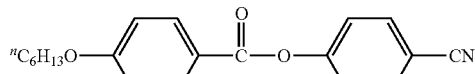 (48)
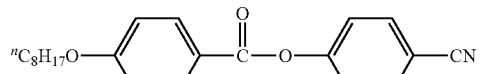 (49)
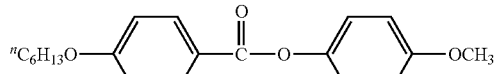 (50)
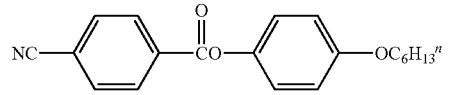 (51)
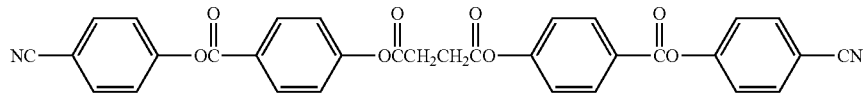 (52)
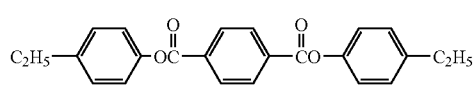 (53)
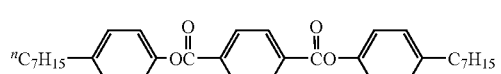 (54)
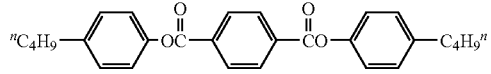 (55)
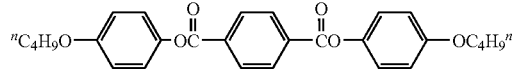 (56)
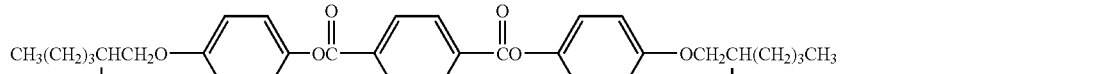 (57)
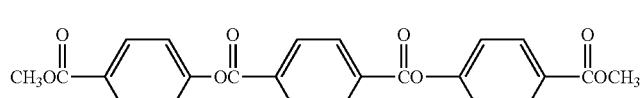 (58)
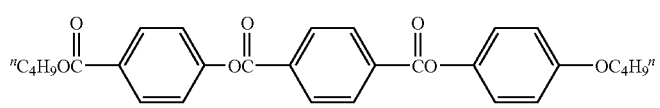 (59)
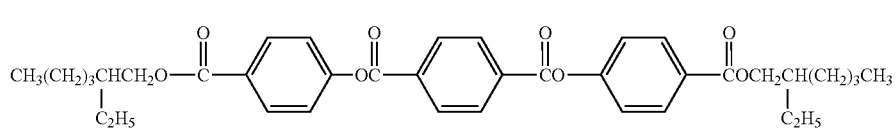 (60)
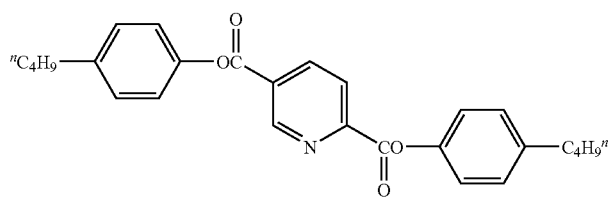 (61)
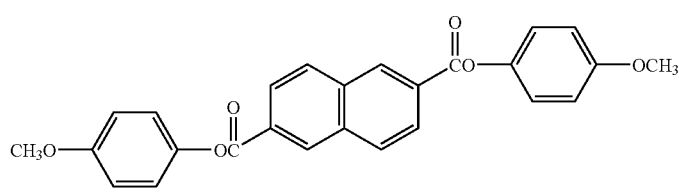 (62)
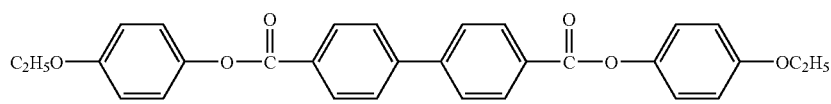 (63)

The rod-shaped retardation increasing agent is used in an amount of preferably from 0.1 to 30 parts by weight, more preferably from 0.5 to 20 parts by weight, per 100 parts by weight of the polymer component.

Two or more of rod-shaped compounds that show in the state of solutions ultraviolet absorption spectra wherein their maximum absorption wavelengths (λmax) are shorter than 250 nm may be used as a combination. Rod-shaped compounds can be synthesized by reference to the methods described in documents. Examples of such documents include *Mol. Cryst. Liq. Cryst.*, volume 53, page 229 (1979), ibid., volume 89, page 93 (1982), ibid., volume 145, page 111 (1987), ibid., volume 170, page 43 (1989); *J. Am. Chem. Soc.*, volume 113, page 1349 (1991), ibid., volume 118, page 5346 (1996), ibid., volume 92, page 1582 (1970); *J. Org. Chem.*, volume 40, page 420 (1975); and *Tetrahedron*, volume 48, number 16, page 3437 (1992).

(Measurement of Spectrum of a Specific Example)

A spectrum of the aforesaid retardation controlling agent (10-trans) in a UV-visible region (UV-vis) was measured. A retardation controlling agent (10-trans) was dissolved in tetrahydrofuran (without a stabilizer (BHT)) to prepare a solution of $10^5$ mol/dm$^3$ in concentration. The thus prepared solution was subjected to measurement by means of a measuring apparatus (manufactured by Hitachi, Ltd.) to find that the wavelength giving the maximum absorption ($\lambda_{max}$) was 220 nm and the extinction coefficient (ε) at the wavelength was 15000. Likewise, with the retardation controlling agent (29-trans), the wavelength giving the maximum absorption ($\lambda_{max}$) was 240 nm and the extinction coefficient (ε) at the wavelength was 20000. Likewise, with the retardation controlling agent (41-trans), the wavelength giving the maximum absorption ($\lambda_{max}$) was 230 nm and the extinction coefficient (ε) at the wavelength was 16000.

It is possible to use two or more rod-shaped compounds having the maximum absorption wavelength ($\lambda_{max}$) in a region shorter than 250 nm.

(Other Retardation Increasing Agents)

In addition to the above-described compounds, those compounds can be added to the optical film of the invention with no limitation which can bring the in-plane retardation Re and the retardation in the thickness direction Rth to desired values and can impart wavelength distribution properties so that Re and Rth at each wavelength satisfies formulae (1) to (4).

[Other Additives]

To the optical film of the invention may further be incorporated a UV ray absorbent such as phenylsalicylic acid, 2-hydroxybenzophenone or triphenyl phosphate, a bluing agent for changing tint, and an antioxidant.

Further, the optical film of the invention may contain known plasticizers such as phthalates (e.g., dimethyl phthalate, diethyl phthalate and dibutyl phthalate), phosphates (e.g., tributyl phosphate), dibasic esters of fatty acid, glycerin derivatives and glycol derivatives for the purpose of improving stretching properties upon stretching the film to be described hereinafter.

[Process of Forming a Film]

As a process of producing the optical film of the invention, a known process for forming a film can be employed. Starting materials may be heated and the molten product may be formed into a film, or starting materials may be dissolved in a solvent and the solution may be formed into a film.

[Process of Forming a Film from a Molten Product]

The optical film of the invention may be produced by a process of forming film from a molten product. Starting materials including a starting polymer and additives may be heated to melt, and the molten product may be formed into a film by extrusion molding. Alternatively, the starting materials may be sandwiched between two plates and press-processed to form into a film.

The heat-melting temperature is not particularly limited as long as the starting polycarbonate copolymer or blend can be uniformly molted at the temperature. Specifically, the starting materials are heated to a temperature of a melting point or softening point thereof or higher than that. In order to obtain a uniform film, it is preferred to heat to a temperature higher than the melting point of the polycarbonate copolymer, preferably to a temperature higher than the melting point by 5 to 40° C., particularly preferably by 8 to 30° C., to melt.

[Process of Forming a Film from a Solution]

It is particularly preferred to produce the optical film of the invention by dissolving the polycarbonate copolymer, blend, additives, and the like in a solvent and forming a film from the solution. In view of particularly improving surface state of the film, the process of forming a film from a solution can be employed as an excellent process for producing a film. Specific techniques for forming a film from a solution are not particularly limited as long as a solution is cast onto a supporting substrate having enough surface smoothness. A dope solution may be spread directly onto a supporting substrate to form a film, or a casting method using gear or various coating methods using a blade may properly be employed. Drying to remove the solvent can be conducted by drying at room temperature or under heating depending upon the boiling point of a used solvent. Drying under heating can be conducted at a temperature of from 30 to 200° C. for about 5 minutes to 2 hours according to the predetermined drying state while allowing to stand or sending air.

In forming the optical film of the invention from a solution, the film can be produced by using a solution (dope) prepared by uniformly dissolving the polycarbonate copolymer, blend, additives, and the like in an organic solvent. As an organic solvent to be preferably used as a main solvent for the optical film of the invention, a solvent selected from among esters containing from 3 to 12 carbon atoms, ketones, ethers and halogenated hydrocarbons containing from 1 to 7 carbon atoms is preferred. The esters, ketones and ethers may have a cyclic structure. Compounds having any two or more functional groups of ester, ketone and ether (i.e., —O—, —CO— and —COO—) may be used as a main solvent. The compounds may have other functional groups such as an alcoholic hydroxyl group. With a main solvent having two or more functional groups, it suffices for the number of carbon atoms to be within the scope of the number of carbon atoms with either of the functional groups.

[Dissolving Step]

As to preparation of a solution (dope) for the optical film of the invention, there exist no particular limits as to dissolving method, and dissolving may be conducted at room temperature, or a method of dissolving under cooling or a method of dissolving at a high temperature or a combination thereof may be employed. Preparation of a solution for the optical film of the invention, and steps of concentration and filtration of the solution following the dissolving step may be conducted according to known methods of dissolving for forming a film.

[Casting]

Next, a process for producing the optical film of the invention from a solution will be described below. As a process and equipment for producing the optical film of the invention, a process for forming a film by casting a solution having conventionally been employed for producing a cellulose triacetate film and a film-forming apparatus for the process are preferably employed. A dope (solution containing polycarbonate and additives) prepared in a dissolving machine (tank) is once stored in a storage tank to remove foams contained in the dope to prepare a final dope. The dope is discharged through a dope-discharging outlet and sent to a pressure die by means of, for example, a pressure type metering pump capable of feeding a solution in a highly accurate amount according to the rotation number, and uniformly cast onto an endlessly running metal support in a casting section through a slit of the pressure type die and, at a peeling point where the metal support almost makes a round, a half-dried dope film (also called web) is peeled from the metal support.

[Drying and Winding up]

The thus-obtained web is gripped at both ends thereof by means of clips and is conveyed by a tenter with keeping the width to dry. Subsequently, the web is conveyed by a group of rolls in a drying apparatus to complete drying, followed by winding up by a winding machine with a predetermined length. A combination of the tenter and a drying machine having a group of rolls varies depending upon the purpose.

[Stretching]

The optical film of the invention may be a high molecular oriented film, wherein molecular chains are oriented, obtained by stretching a non-stretched film of the above-described polycarbonate.

As a stretching method, there are illustrated, for example, a simultaneous biaxially stretching method of stretching a film in a width direction by clips moving with different speeds in the film-flowing direction, a longitudinally and uniaxially stretching method of gripping side edges of a film with pins or clips and utilizing difference in moving speed of the gripped portion in the film-flowing direction, and a transversely and uniaxially stretching method of enlarging the portion gripped by a tenter in the width direction. Also, there is illustrated a sequential biaxially stretching method of combining these stretching methods and a roll longitudinally and uniaxially stretching method utilizing roll speed difference. In preparing the optical film of the invention, stretching techniques are not particularly limited. Although several examples of continuously stretching methods are illustrated, the method of stretching the optical film of the invention is not limited only to them. Continuous stretching is preferred in view of productivity but is not necessary.

However, it is preferred to employ a proper stretching method in order to obtain the optical film of the invention having desired optical performance with respect to Re and Rth and having ideal wavelength dependence of the optical properties.

In order to make desirable wavelength distribution of Re and Rth of the optical film in accordance with the invention, it is most preferred to freely stretch in the longitudinal direction (mechanically film-conveying direction) and form neck-in in the transverse direction. The same effect can be obtained by conducting the procedure of width-enlarging stretching while holding by a tenter in the transverse direction and, at the same time, relaxing (contracting) in the longitudinal direction. Such method can increase the refractive index in the thickness direction while orienting the polymer chain to a direction of stretching with a higher stretch ratio to thereby provide desired optical performance. The desired stretch ratio in this method is preferably from 1.1 to 4.0 times the original, more preferably from 1.2 to 3.5 times the original, still more preferably from 1.5 to 3.0 times the original, in the longitudinal direction.

A stretching method next desirable for the optical film of the invention is a fixed biaxially stretching method of holding both longitudinally and transversely, with the stretch ratio in the longitudinal direction being higher than that in the transverse direction. The actual stretch ratio in the longitudinal direction is from 1.2 to 3.0 times the original, preferably from 1.3 to 2.5 times the original, more preferably from 1.4 to 2.0 times the original, and the stretch ratio in the longitudinal direction is preferably larger than the stretch ratio in the transverse direction by 1.1 to 3.0 times, more preferably by 1.3 to 2.0 times. In case when the stretch ratio in the transverse direction is larger than the stretch ratio in the longitudinal direction, there results undesirable Re. In case when both the stretch ratio in the longitudinal direction and the stretch ratio in the transverse direction exceeds the above-described ranges, there result a large refractive index in the in-plane direction and a reduced refractive index in the thickness direction, thus such stretch ratios not being preferred particularly with respect to Rth value and wavelength distribution of Rth.

Upon stretching, stretching may be conducted with the organic solvent having been used upon preceding formation of the film remaining in the film. The amount of the organic solvent influences not only stretching ease but Re and Rth of a resulting optical film, and wavelength distribution properties. The amount of residual organic solvent upon stretching is preferably from 5 to 50% by weight, more preferably from 7 to 45% by weight, still more preferably from 10 to 40% by weight, based on the polymer solid component.

[The Amount of Residual Solvent in the Film]

In the case of obtaining the optical film of the invention by a process of forming a film from a solution, it is preferred to dry under such condition that the final amount of the residual solvent becomes within a range of from 0.01 to 1.5% by weight, more preferably from 0.01 to 1.0% by weight. Additionally, the amount of residual solvent can be represented by the following formula:

Amount of residual solvent (% by weight)=$\{(M-N)/N\} \times 100$

In the above formula, M represents a weight of web at any point, and N represents a weight after drying M at 110° C. for 3 hours.

[Haze]

The optical film is preferably transparent and has a haze value of preferably 3% or less, with a transmittance for entire light rays being preferably 85% or more. Measurement of haze can be conducted according to JIS K-6714 using a haze meter (HGM-2DP; Sugga Shikenki).

[Stack Type Optical Compensatory Film]

In the invention, the optical film is not limited to a film of a single layer structure but may have a layered structure wherein plural layers are stacked one over the other. In an embodiment of the layered structure, materials of individual layers may not be the same. For example, an optically anisotropic layer using a rod-shaped liquid crystal and an optically anisotropic layer using a discotic liquid crystal may be used independently or in combination thereof. Also, the stacking film may be a layered product of a polymer film and an optically anisotropic layer comprising a liquid crystalline compound. In an embodiment of the layered structure, a coating type layered product containing a layer formed by coating is more preferred than a layered product of high molecular stretched films in view of thickness.

(Optical Compensatory Film Comprising a Liquid Crystalline Compound)

In the case of using a liquid crystalline compound for preparing the aforesaid optical compensatory film, optically anisotropic layers prepared by fixing a liquid crystalline compound in a specifically aligned state give desired optical properties as a single layer or a layered product of plural layers since liquid crystal compounds take various alignment states. That is, the optical compensatory film may be an embodiment which comprises a support and one or more optically anisotropic layers formed on the support. Retardation of the entire optical compensatory film of such embodiment can be adjusted by optical anisotropy of the optically anisotropic layer. Liquid crystalline compounds can be calcified into rod-shaped liquid crystal compounds and discotic liquid crystal compounds based on the shape of the molecule. Each type is classified into a low molecular type and a high molecular type, both being usable. In the case of using the liquid crystalline compound for preparing the optical compensatory film, it is preferred to use a rod-shaped liquid crystal compound or a discotic liquid crystal compound, and it is more preferred to use a rod-shaped liquid crystal compound having a polymerizable group or a discotic liquid crystal compound having a polymerizable group.

(Optically Anisotropic Layer Comprising a Polymer Film)

As is described above, the optically anisotropic layer may be formed by a polymer film. The polymer film is formed from a polymer which can show optical anisotropy. Examples of such polymer include polyolefins (e.g., polyethylene, polypropylene and norbornene series polymer), polycarbonate, polyarylate, polysulfone, polyvinyl alcohyol, polymethacrylate, polyacrylate and cellulose esters (e.g., cellulose triacetate and cellulose diacetate). It is also possible to use a copolymer of these polymers or a polymer mixture.

Optical anisotropy of the polymer film is preferably imparted by stretching. Stretching is preferably uniaxial stretching or biaxial stretching. Specifically, longitudinal uniaxial stretching utilizing difference in peripheral velocity of two or more rolls, tenter stretching of stretching in the transverse direction by gripping both sides of the polymer film, or biaxial stretching by combination thereof is preferred. Additionally, two or more polymer films which satisfy the aforesaid conditions as an entire film comprising two of them may be used. The polymer film is preferably produced by a solvent-cast process in order to reduce unevenness in birefringence. The thickness of the polymer film is preferably from 20 to 500 µm, most preferably from 40 to 100 µm.

Also, there may be preferably employed a process of producing a polymer film forming an optically anisotropic layer by using at least one polymer material selected from the group consisting of polyamide, polyimide, polyester, polyether ketone, polyamidoimido polyester imide and polyaryl ether ketone, coating a solution prepared by dissolving the polymer in a solvent on a substrate, and removing the solvent to form a film. In this occasion, a technique of stretching the polymer film and the substrate to impart optical anisotropy to use as an optically anisotropic layer can also be preferably employed. The optical film of the invention can preferably be used as the substrate. Also, it is preferred to prepare the polymer film on a different substrate, peel the polymer film from the substrate, and stick it onto the optical film of the invention, the layered product being used as an optically anisotropic layer. According to this technique, the thickness of the polymer film can be reduced to preferably 50 µm or less, preferably from 1 to 20 µm. It is preferred for the optically anisotropic layer to have Re(550) of from 0 to 200 nm and Rth(550) of from −400 to 400 nm. More preferably, Re(550)=0 to 150(nm) and Rth (550)=−300 to 300(nm).

[Polarizing Plate]

In the case of using the optical film of the invention as an optical compensatory film, the optical compensatory film may be stuck onto a polarizing plate via an adhesive, with the polarizing plate having been prepared by sticking a protective film onto each side of a polarizer. It is also possible to directly stick the optical film of the invention onto a polarizer as a protective film for a polarizing plate. In this case, the process for preparing the polarizing plate of, for example, polyvinyl alcohol type is not particularly limited, and can be prepared by a general process. For example, there is a process of subjecting the surface of the optical film to alkali saponification treatment, plasma treatment or corona discharge treatment to modify the surface and sticking the optical film onto each side of a polarizer prepared by dip-stretching a polyvinyl alcohol film (PVA) in an iodine solution.

In a liquid crystal display, a substrate containing a liquid crystal is usually disposed between two polarizing plates. However, a polarizing plate to which the optical film of the invention is applied may be disposed at any position.

Figure 7:
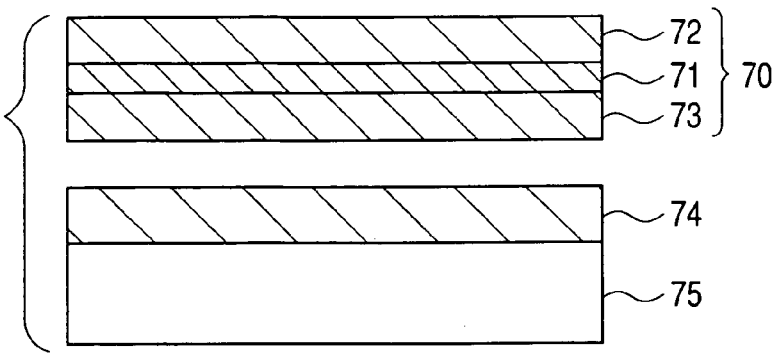
FIG. 7 is a view schematically showing a cross-sectional structure of one example of a polarizing plate according to an aspect of the invention.
Figure 8:
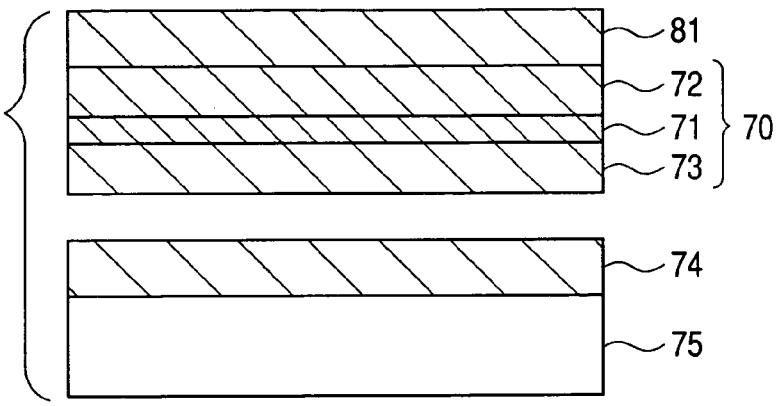
FIG. 8 is a view schematically showing a cross-sectional structure of another example of a polarizing plate according to an aspect of the invention.

FIG. 7 is a view schematically showing a cross-sectional structure of one example of the polarizing plate of the invention (a glass plate for liquid crystal cell being shown for the purpose of description). In FIG. 7, a protective film 72 and a protective film 73 are disposed on respective sides of a polarizer 71, with at least one of them having the optical film of the invention. This polarizing plate 70 is stuck onto a glass 75 for a liquid crystal cell via an adhesive layer 74. FIG. 8 is a view schematically showing a cross-sectional structure of another example of the polarizing plate of the invention. In the embodiment shown by FIG. 8, a functional layer as described hereinbefore is provided on the polarizing plate shown by FIG. 7.

[Functional Layer]

In the case of using the optical film of the invention as a protective film for a polarizing plate to be used in a liquid crystal display, various functional layers may be provided on the surface thereof. Examples of the functional group include a cured resin layer (transparent hard coat layer), an antiglare layer, an antireflection layer, an easily adhesive layer, an optical compensation layer, an aligning layer and an antistatic layer for the liquid crystal layer. As the functional layers for which the hybrid film of the invention can be used and materials thereof, there are illustrated surfactants, lubricating agents, matting agents, an antistatic layer and a hard coat layer. These are described in detail in *Hatsumei Kyokai Kokai Giho* (Kogi No. 2001-1745; issued on 15th, Mar. 2001; Hatsumei Kyokai), pp. 32-45, and can preferably be used in the invention.

[Liquid Crystal Display]

In a liquid crystal display of the invention, an optical film (optical compensatory film), a liquid crystal cell and a polarizing plate are used in combination. The optical film (optical compensatory film), liquid crystal cell and polarizing plate are preferably in close contact with each other. A known tackifier or adhesive can be used for bringing them into close contact with each other.

An optical film and an optical compensatory film using the same in an aspect of the invention can be used in various display-mode liquid crystal cells and liquid crystal displays. Various display modes, including TN (Twisted Nematic), IPS (In-Plane Switching), FLC (Ferroelectric Liquid crystal), AFLC (Anti-ferroelectric Liquid crystal), OCB (Optically Compensatory Bend), STN (Super Twisted Nematic), VA (Vertically Aligned) and HAN (Hybrid Aligned Nematic) modes, have been proposed. Also, a domain division type of the above-described display mode has been proposed. Advantages obtained by using the film of the invention having improved physical properties are particularly remarkable with a large-sized screen liquid crystal display and, in view of this point, it is particularly preferred to use the film of the invention for a VA mode liquid crystal display for use in a large TV set.

Figure 9:
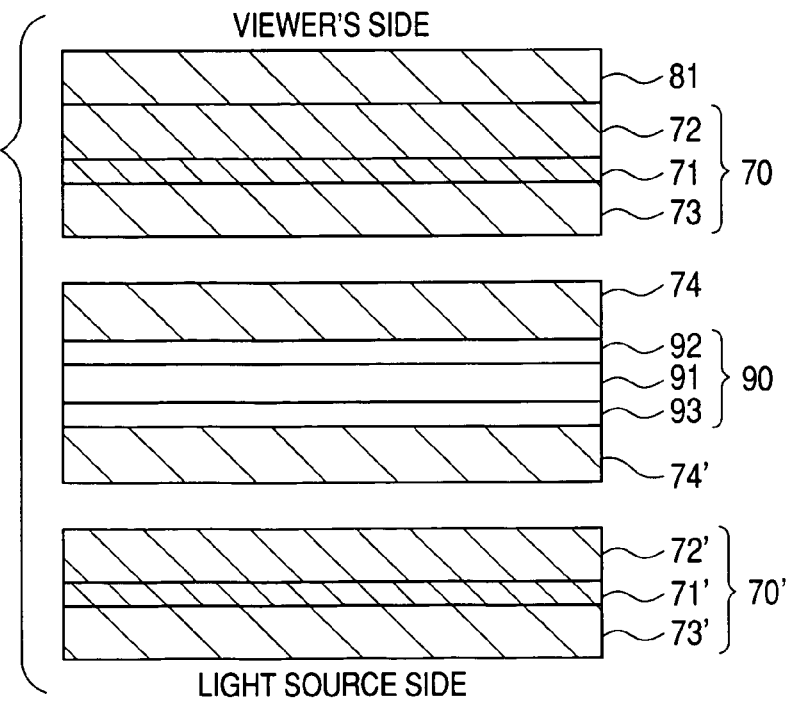
FIG. 9 is a view showing an example of a liquid crystal display according to an aspect of the invention.
Figure 10:
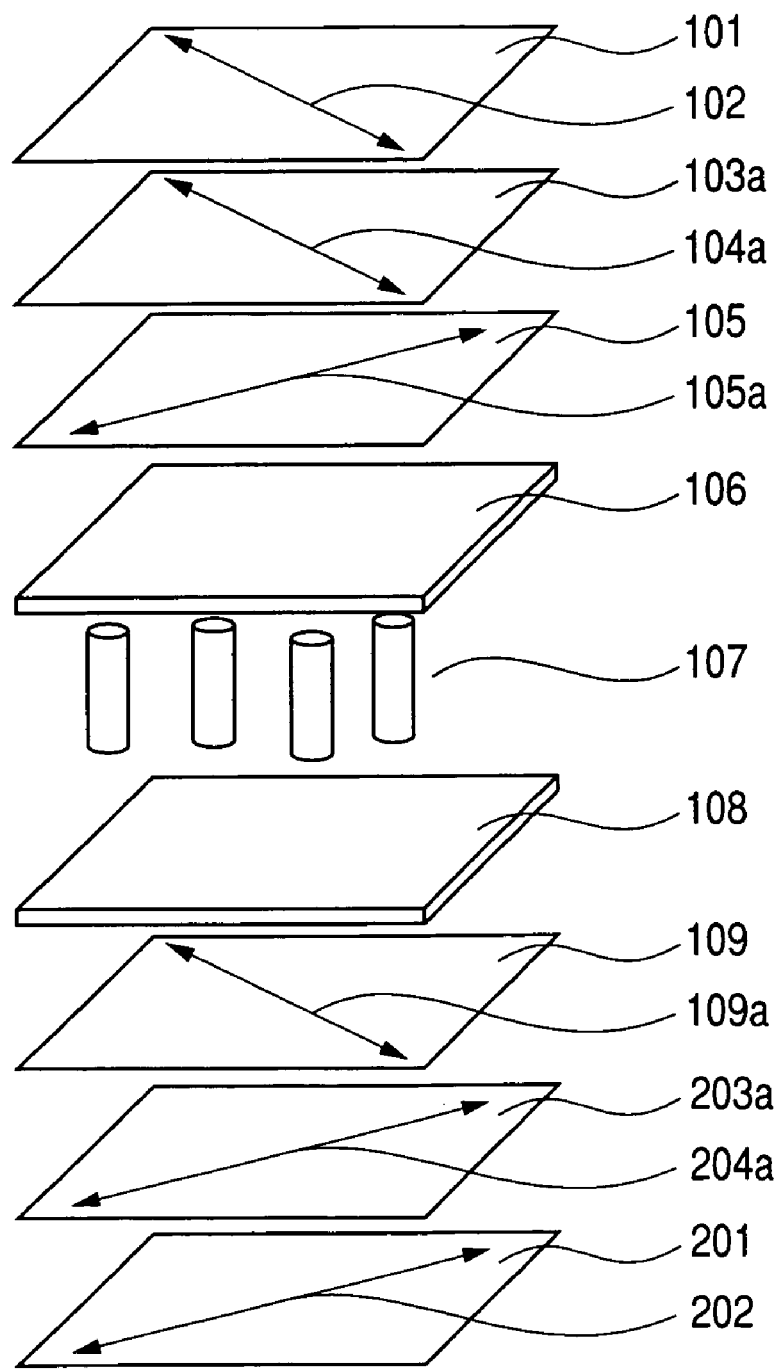
FIG. 10 is a view showing an example of a liquid crystal display according to an aspect of the invention.

FIGS. 9 and 10 show examples of the liquid crystal display of the invention.

In FIG. 9, protective films 72 and 73 are provided on respective sides of a polarizer 71, with at least one of them having the optical film of the invention. It is preferred to provide the optical film of the invention on the liquid crystal side. Also, a functional layer 81 is provided on the protective film 72 (viewer's side). This polarizing plate 70 is stuck onto a glass 92 for a liquid crystal cell via an adhesive layer 74. The liquid crystal cell 90 is formed by sandwiching a liquid crystal layer 91 between the glasses 92 and 93 for liquid crystal cell. Onto the glass 93 for liquid crystal cell on a light source side is stuck a polarizing plate 70' via an adhesive layer 74'. The polarizing plate 70' comprises a polarizer 71' having on both sides thereof protective films 72' and 73', respectively. In the invention, it suffices for either or both of the polarizing plates 70 and 70' to have the optical film of the invention.

FIG. 10 further more specifically illustrates the liquid crystal display of the invention. In FIG. 10, the liquid crystal display has a liquid crystal cell comprising a liquid crystal layer 107 sandwiched between an upper substrate 106 and a lower substrate 108. The upper substrate 106 and the lower substrate 108 have been subjected to orientation treatment on the liquid crystal side thereof. Polarizing films 101 and 201 are disposed so as to sandwich the liquid crystal cell. The polarizing films 101 and 201 are disposed so that a transmission axis 102 of the polarizing film 101 and a transmission axis 202 of the polarizing film 201 are at right angles with each other and are at an angle of 45 degrees with respect to the direction to which the liquid crystal layer of the liquid crystal cell 107 leans when a voltage is applied to the liquid crystal cell. Optical films of the invention 103a and 203a and optical anisotropic layers 105 and 109 are respectively disposed between the polarizing film 101 and the liquid cell and between the polarizing film 201 and the liquid cell.

The optical films 103a and 203a are disposed so that in-plane slow axes 104a and 204a thereof are parallel to the direction of the transmission axes 102 and 202 of the polarizing membranes 101 and 201 adjacent thereto.

Also, the liquid crystal layer 107 has a structure that, in a state of no voltage being applied thereto, longer axis of the liquid crystal molecule is aligned in a direction almost vertical to the panel face.

Additionally, in the case of disposing the optical film on one side of the liquid crystal cell, a film other than the optical film of the invention may be disposed on the other side of the liquid crystal cell. However, the other film is preferably a film satisfying the following formulae (7) to (11).

$$0 < Re(550) < 10, \text{ preferably } 0 < Re(550) < 5 \tag{7}$$

$$30 < Rth(550) < 400, \text{ preferably } 40 < Rth(550) < 300 \tag{8}$$

$$10 < Rth(550)/Re(550), \text{ preferably } 15 < Rth(550)/Re(550) \tag{9}$$

$$1.0 < Rth(450)/Rth(550) < 2.0, \text{ preferably } 1.05 < Rth(450)/Rth(550) < 1.9 \tag{10}$$

$$0.5 < Rth(650)/Rth(550) < 1.0, \text{ preferably } 0.55 < Rth(650)/Rth(550) < 0.95 \tag{11}$$

It is also possible to use various optical films such as a prism sheet and a diffusion film between members such as the optical film, liquid crystal cell and polarizing plate described above.

Although preferred values of the in-plane retardation and retardation in the thickness direction of the optical film somewhat vary depending upon the retardation value in the thickness direction of liquid crystal and average refractive index n of the liquid crystal and the optical film, it is desirable to optimize according to the purpose.

EXAMPLES

The invention will be described in detail by reference to Examples which, however, are not to be construed as limiting the invention in any way.

Monomer structures of polycarbonates used in Examples and Comparative Examples to be described hereinafter are shown below. Measurement of high polymer copolymerization ratio was conducted by means of a proton NMR of "JNM-alpha600" (Nihon Denshi K. K.). In particular, with a copolymer of bisphenol A (BPA) and biscresolfluorene (BCF), deutrobenzene was used as a solvent, and the ratio was calculated based on the proton intensity ratio with respective methyl groups.

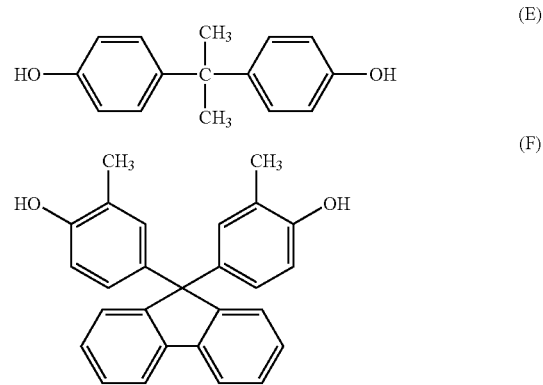

Example 1

An aqueous solution of sodium hydroxide and ion-exchanged water were charged in a reactor equipped with a stirrer, a thermometer and a reflux condenser, and monomers (E) and (F) respectively having the above-described structures were dissolved therein with a molar ratio of 47:53, followed by adding thereto a small amount of hydrosulfite. Subsequently, methylene chloride was added thereto, and phosgene was blown thereinto at 20° C. in about 60 minutes. Further, p-tert-butylphenol was added thereto to emulsify, followed by adding thereto triethylamine and stirring the mixture at 30° C. for about 3 hours to complete the reaction. After completion of the reaction, the organic phase was separated, and methylene chloride was distilled off to obtain a polycarbonate copolymer. The composition ratio of the resulting copolymer was almost the same as the ratio with charged monomers.

3 Parts of the following discotic compound per 100 parts by weight of the copolymer was dissolved in methylene chloride to prepare a dope solution containing 18% by weight of solid components. This dope solution was continuously cast through a die onto a stainless steel-made band and was then peeled from the band at a residual solvent amount of 20% by weight, followed by free uniaxial stretching with a stretch ratio of 1.8 times the original in the longitudinal direction in a 200° C. drying zone between roll sets different from each other in rotation velocity. Further, the stretched film was passed through a drying zone where the residual solvent amount was reduced to 1% by weight or less to obtain an optical film having properties shown in Table 1.

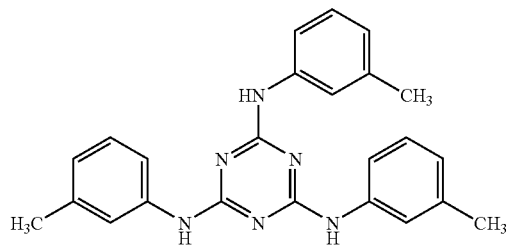

Comparative Example 1

A film having properties shown in Table 1 was obtained in the same procedure as in Example 1 except for not adding the discotic compound to the polycarbonate copolymer of Example 1.

Comparative Example 2

A dope solution containing 18% by weight of solid components was prepared without adding the discotic compound to the polycarbonate copolymer of Example 1. This dope solution was continuously cast through a die onto a stainless steel-made band and was then peeled from the band at a residual solvent amount of 20% by weight, followed by stretching with a stretch ratio of 1.8 times the original in the longitudinal direction in a 200° C. drying zone between roll sets different from each other in rotation velocity then stretching with a stretch ratio of 2.0 times the original in the transverse direction in a tenter zone. Further, the stretched film was passed through a drying zone where the residual solvent amount was reduced to 1% by weight or less to obtain an optical film having properties shown in Table 1.

Example 2

The same dope solution as used in Example 1 was used. This dope solution was continuously cast through a die onto a stainless steel-made band and was then peeled from the band at a residual solvent amount of 20% by weight, followed by free uniaxial stretching with a stretch ratio of 1.4 times the original in the longitudinal direction in a 200° C. drying zone between roll sets different from each other in rotation velocity. Further, the stretched film was passed through a drying zone where the residual solvent amount was reduced to 1% by weight or less to obtain an optical film having properties shown in Table 1.

Comparative Example 3

A film having properties shown in Table 1 was prepared in the same procedure as in Example 2 except for adding the discotic compound to the polycarbonate copolymer of Example 1.

Example 3

A dope solution containing 18% by weight of solid components was prepared by dissolving in methylene chloride 3 parts by weight of the following rod-shaped compound in place of the discotic compound used in Example 1 per 100 parts by weight of the polycarbonate. This dope solution was continuously cast through a die onto a stainless steel-made band and was then peeled from the band at a residual solvent amount of 20% by weight, followed by free uniaxial stretching with a stretch ratio of 1.6 times the original in the longitudinal direction in a 200° C. drying zone between roll sets different from each other in rotation velocity. Further, the stretched film was passed through a drying zone where the residual solvent amount was reduced to 1% by weight or less to obtain an optical film having properties shown in Table 1.

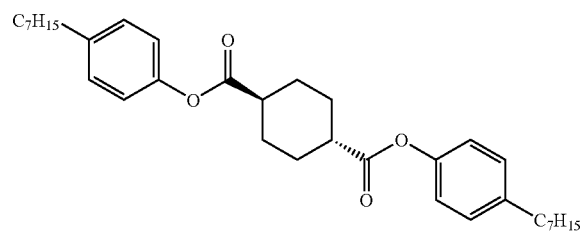

Comparative Example 4

A film having properties shown in Table 1 was prepared in the same procedure as in Example 3 except for not adding the rod-shaped compound to the polycarbonate copolymer of Example 1.

Compositions, methods of forming a film, optical properties and performances exerted when mounted on a liquid crystal display of the optical films of the invention are shown in Table 1.

TABLE 1

|  |  | Example 1 | Comparative Example 1 | Comparative Example 2 | Example 2 | Comparative Example 3 | Example 3 | Comparative Example 4 |
|---|---|---|---|---|---|---|---|---|
| Stretch ratio | Longitudinal direction | 1.8 | 1.8 | 1.8 | 1.8 | 1.8 | 1.6 | 1.6 |
|  | Transverse direction | — | — | 2.0 | — | — | — | — |
| Re(nm) | 450 | 42 | 54 | 68 | 34 | 45 | 118 | 123 |
|  | 550 | 67 | 66 | 65 | 54 | 54 | 150 | 150 |
|  | 650 | 89 | 76 | 63 | 74 | 61 | 165 | 159 |
|  | 450/550 | 0.63 | 0.82 | 1.05 | 0.63 | 0.83 | 0.79 | 0.82 |
|  | 650/550 | 1.33 | 1.15 | 0.97 | 1.37 | 1.13 | 1.10 | 1.06 |
| Rth(nm) | 450 | 264 | 192 | 235 | 140 | 102 | 82 | 62 |
|  | 550 | 228 | 227 | 226 | 122 | 121 | 75 | 75 |
|  | 650 | 217 | 258 | 214 | 114 | 134 | 70 | 80 |
|  | 450/550 | 1.16 | 0.85 | 1.04 | 1.15 | 0.84 | 1.09 | 0.83 |
|  | 650/550 | 0.95 | 1.14 | 0.95 | 0.93 | 1.11 | 0.93 | 1.07 |
| (Re450/Rth450)/(Re550/Rth550) | | 0.54 | 0.97 | 1.01 | 0.55 | 0.99 | 0.72 | 0.99 |
| (Re650/Rth650)/(Re550/Rth550) | | 1.40 | 1.01 | 1.02 | 1.47 | 1.02 | 1.18 | 0.99 |
| Change in tint Azimuthal angle: 45°; polar angle: 60°; upon black display | | A no coloration | C reddish | B slightly reddish | A no coloration | C reddish | A no coloration | B reddish |

(Processing to Prepare a Polarizing Plate)

Each of the optical film samples of the invention obtained in Examples and the optical film samples obtained in Comparative Examples was stuck onto a commercially available polarizing plate (HLC2-5618; manufactured by Sanritz Corporation) using an adhesive to prepare a polarizing plate having an optical compensatory film.

Example 4

[Mounting on a VA Panel]

Figure 11:
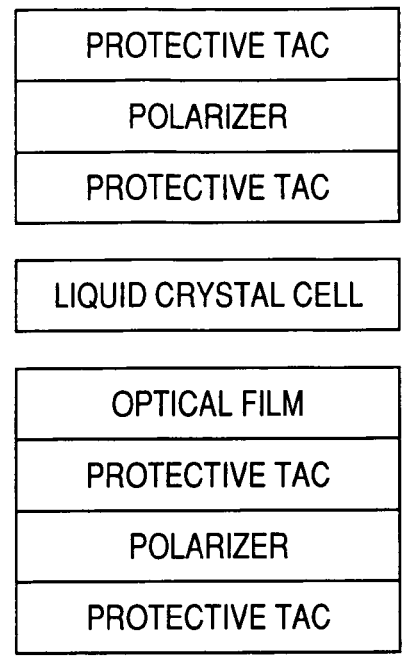
FIG. 11 is a view for illustrating a layer structure of a liquid crystal panel employed in Example.

Polarizing plats and retardation plates on the surface and the back side of a VA mode liquid crystal TV set (LC-20C5; manufactured by Sharp Corp.) were removed and the polarizing plate having an optical film prepared by processing the optical film prepared in Example 1 was stuck on the back side and a commercially available polarizing plate (HLC2-5618; manufactured by Sanritz Corporation) was stuck on the surface using a laminate roll to thereby prepare a liquid crystal panel of the layer structure shown in FIG. 11. In FIG. 11, a protective tac means a protective film. Likewise, the samples obtained in Comparative Examples 1 and 2 were stuck in the same procedure.

Figure 12:
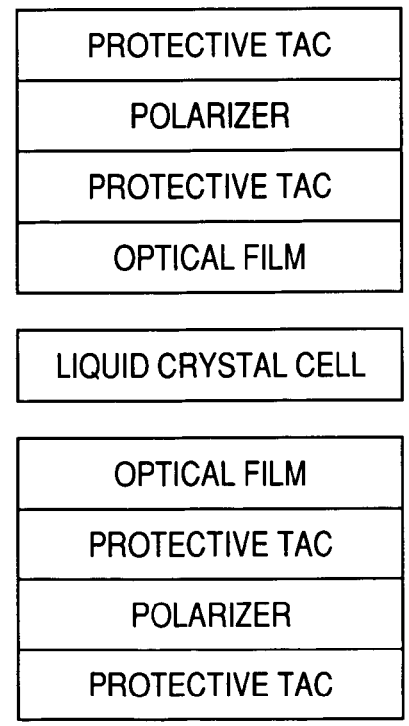
FIG. 12 is a view for illustrating a layer structure of a liquid crystal panel employed in Example.

Next, two sets of the optical film-having polarizing plates obtained by processing the optical film prepared in Example 2 were prepared and respectively stuck onto both sides (upper and lower sides) of a liquid crystal cell to prepare a liquid crystal panel having the layer structure shown in FIG. 12. Likewise, the sample obtained in Comparative Example 3 was stuck in the same procedure.

Figure 13:
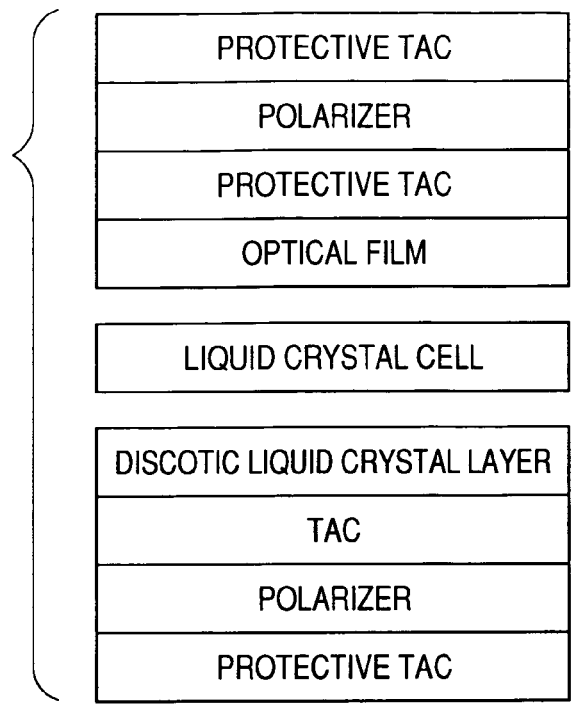
FIG. 13 is a view for illustrating a layer structure of a liquid crystal panel employed in Example.

Further, a liquid crystal panel having the layer structure of FIG. 13 was prepared by sticking an optical film-having polarizing plate obtained by processing the optical film prepared in Example 3 onto the surface side of a liquid crystal cell and sticking a film coated with a discotic liquid crystal layer having the performance shown in Table 2 onto the back side of the liquid crystal cell to prepare a liquid crystal cell having the layer structure shown in FIG. 13. Likewise, sample obtained in Comparative Example 4 was stuck in the same procedure.

TABLE 2

| Re(nm) | 450 | 4 |
|---|---|---|
|  | 550 | 3 |
|  | 650 | 2 |
| Rth(nm) | 450 | 240 |
|  | 550 | 228 |
|  | 650 | 217 |

Additionally, the film having coated thereon the discotic liquid crystal layer was prepared in the following manner.

On one side of FUJITAC TD80UL manufactured by Fuji Photo Film Co., Ltd. was coated a 1.0 N potassium hydroxide aqueous solution (solvent:water/isopropyl alcohol/propylene glycol=69.2 parts by weight/15 parts by weight/15.8 parts by weight) in an amount of 10 cc/m$^2$ and, after keeping it at about 40° C. for 30 seconds, the alkaline solution was wiped off, and the film was washed with pure water, followed by removing water droplets by an air-knife. Subsequently, the film was dried at 100° C. for 15 seconds.

(Preparation of Orienting Film)

On this Tac film was coated a coating film of the following formulation for forming an orienting film was coated in an amount of 28 ml/m$^2$ using a #16 wire bar coater. This film was dried in a 60° C. warm air for 60 seconds, then in a 90° C. warm air for 150 seconds to thereby prepare an orienting film.

Formulation of the coating solution for the orienting film:

| Modified polyvinyl alcohol shown below | 10 parts by weight |
|---|---|
| Water | 371 parts by weight |
| Methanol | 119 parts by weight |
| Glutaraldehyde (crosslinking agent) | 0.5 part by weight |
| Citrate (AS3; manufactured by Sankyo Kagaku K.K.) | 0.35 part by weight |

Modified polyvinyl alcohol

-continued

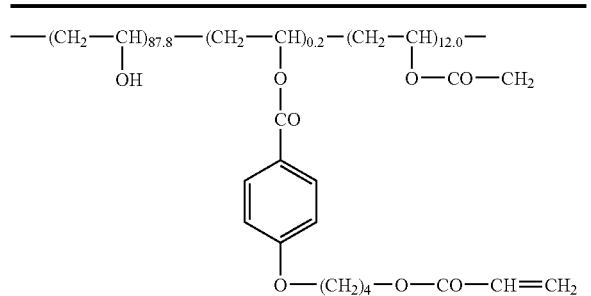

The film was dried at 25° C. for 60 seconds, in a 60C warm air for 60 seconds, and in a 90° C. warm air for 150 seconds. The thickness of the dried orienting film was found to be 1.1 µm. The surface roughness of the orienting film was measured by an atomic force microscope (AFM; SP1380ON; manufactured by Seiko Instruments K.K.) to be 1.147 nm. (Formation of an optically anisotropic layer)

A coating solution of the following formulation containing a discotic liquid crystal was continuously coated on the orienting film surface of the above-prepared tac film, which was prepared above and conveyed at a speed of 20 m/min, by rotating a #4.2 wire bar at 380 rpm in the same direction as the film-conveying direction.

Formulation of the coating solution for the discotic liquid crystal layer:

| | |
|---|---|
| The discotic liquid crystalline compound shown below | 32.6 wt % |
| The following compound | 0.1 wt % |
| (additive for aligning the discotic plane within 5 degrees) | |
| Ethylene oxide-modified trimethylol propane triacrylate | 3.2 wt % |
| (V#360; manufactured by Osaka Yuki Kagaku K.K.) | |
| Sensitizing agent | 0.4 wt % |
| (Kayacure DETX; manufactured by Nippon Kayaku K.K.) | |
| Photo polymerization initiator | 1.1 wt % |
| (Irgacure 907; manufactured by Ciba Geigy) | |
| Methyl ethyl ketone | 62.6 wt % |

Discotic liquid crystalline compound

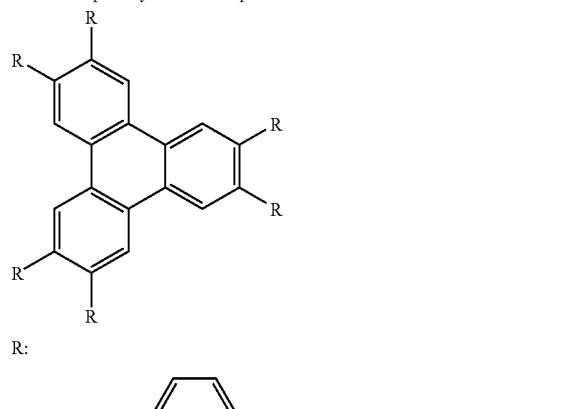

Additive for aligning the discotic plane within 5 degrees

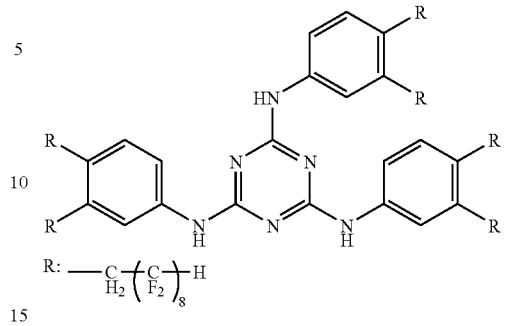

The solvent was removed in the step of continuously heating from room temperature to 100° C., and then the coated film was heated in a 130° C. drying zone for about 90 seconds under the condition that the wind velocity at the film surface of the discotic compound layer became 2.5 m/sec to thereby align the discotic liquid crystal compound. Subsequently, the film was irradiated for 4 seconds with UV rays in a UV ray irradiating apparatus (UV ray lamp: 120 W/cm in output) under the condition that the surface temperature of the film was about 130° C. to proceed the cross-linking reaction and fix the discotic liquid crystal compound in the thus-aligned state. Subsequently, the film was allowed to cool to room temperature and was wound up in a cylindrical form to form a roll. Thus, a roll-shaped optical film was prepared. Additionally, the angle between the discotic plane of the discotic liquid crystal compound and the tac film plane was 0 degree.

The liquid crystal-free surface of the thus-prepared film coated with the discotic liquid crystal layer was subjected to a saponification treatment. On the other hand, one side of a commercially available Fujitac TD80UL (manufactured by Fuji Photo Film Co., Ltd.) was similarly subjected to the saponification treatment. Further, a polarizer was prepared by adsorbing iodine with a stretched polyvinyl alcohol film, and the formerly prepared saponification-treated optical film coated with the discotic liquid crystal and the Fujitac were respectively stuck onto both sides of the polarizer. Thus, a polarizing plate both sides of which were protected was prepared.

(Evaluation of Tint of a Panel Depending upon Viewing Angle)

With each of the samples of the layer structure shown by FIGS. 11 to 13 and mounted on a liquid crystal display, change in tint when viewed from the direction of 45 degrees in azimuthal angle and 60 degrees in polar angle upon black display was evaluated. In the evaluation of tint, "A" represents that no change in tint (yellowish or reddish tint) was observed, "B" represents that change in tint was observed at a polar angle of 60 degrees but that change in tint disappeared when the polar angle was returned to 30 degrees, "C" represents apparent change in tint at every polar angle.

All of the samples using the optical film of the invention and prepared in Examples gave almost no coloration (change in tint) when viewed from an oblique direction and suffered no light leakage. On the other hand, when viewed from an oblique direction, the samples of Comparative Examples suffered serious leakage of light, and coloration of leaked light (with a tendency to being slightly reddish) was observed. The measurement was also conducted when the screen gave a white display to determine a contrast ratio compared with upon black display. It was found that, in the case of using the optical films of the invention, excellent contrast ratios were always obtained.

As is described above, the optical film of the invention having desired performance with respect to Re and Rth shows a high contrast ratio over an excellently wide range, and can provide an optical compensatory film which can suppress change in tint and, further, can provide a polarizing plate and a liquid crystal display using the same.

Example 5

(Optical Compensatory Film Having a Discotic Liquid Crystal Layer)

While in the constitution of FIG. 13 with respect to Example 4, a discotic liquid crystal was coated on Fujitac TD80UL, the optical film obtained in Example 3 was used in place of TD80UL and was combined with the discotic liquid crystal to prepare an optical compensatory film. In this occasion, the same procedures were conducted except that corona treatment was employed in place of the alkali saponification treatment and that the count of wire bar was changed from #4.2 to #2.7. The thus-obtained optical compensatory film had Re(550) of 150 nm and Rth(550) of 175 nm.

(Evaluation When Mounted on a VA Mode Liquid Crystal Display)

Figure 14:
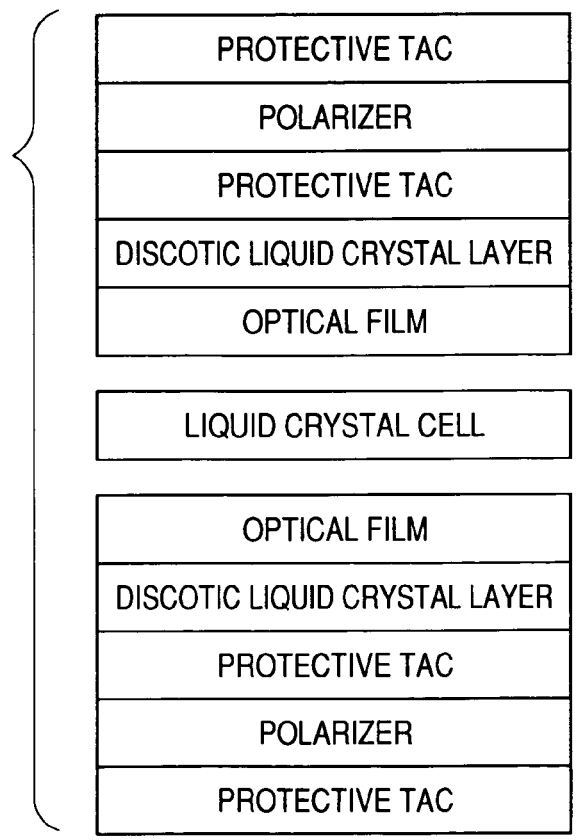
FIG. 14 is a view for illustrating a layer structure of a liquid crystal panel employed in Example.

Two sets of the thus-prepared optical compensatory films were prepared and mounted with a layer structure shown in FIG. 14. In this occasion, the discotic liquid crystal-coated side was disposed on the protective tac side, and the optical film was disposed on the liquid crystal cell side, both being adhered using an adhesive.

Comparative Example

An optical compensatory film was prepared in the same procedures as described above wherein the optical film obtained in Comparative Example 4 was combined with the discotic liquid crystal. The resulting optical compensatory film had Re(550) of 150 nm and Rth(550) of 175 nm. This was mounted with the same layer structure as described above.

Tint properties depending upon viewing angle of the thus-obtained liquid crystal display was measured and, as a result, it was found that the optical compensatory film using the optical film of the invention obtained in Example 3 underwent markedly less change in tint than the optical compensatory film using the film of Comparative Example 4 when viewed from left side, right side, upper side and lower side and showed excellent viewing angle properties

Example 6

(Optical Compensatory Film Containing a Polyimide Layer)

An optical compensatory film sample was prepared using the optical film sample of the invention in Example 2 according to the process described in Example 1 of JP-A-2003-315541. A polyimide of 70,000 in weight-average molecular weight (Mw) and about 0.04 in Δn synthesized from 2,2'-bis (3,4-dicarboxyphenyl)hexa-fluoropropane dianhydride (6FDA) and 2,2'-bis(trifluoro-methyl)-4,4'-diaminobiphenyl (TFMB) was dissolved in a solvent of cyclohexanone to prepare a 25 wt % solution. This solution was coated on the optical film of the invention prepared in Example 2. Subsequently, the film was heat-treated at 100° C. for 10 minutes, then longitudinally and uniaxially stretched at 160° C. to obtain an optical compensatory film comprising the optical film of the invention having coated thereon a 6-μm thick polyimide film. This optical compensatory film had optical properties of 72 nm in Re(550), 220 nm in Rth(550) and within ±0.3 degree in deviation angle of alignment angle and had a birefringent layer of $n_x > n_y > n_z$.

(Evaluation When Mounted on a VA Mode Liquid Crystal Display)

Figure 15:
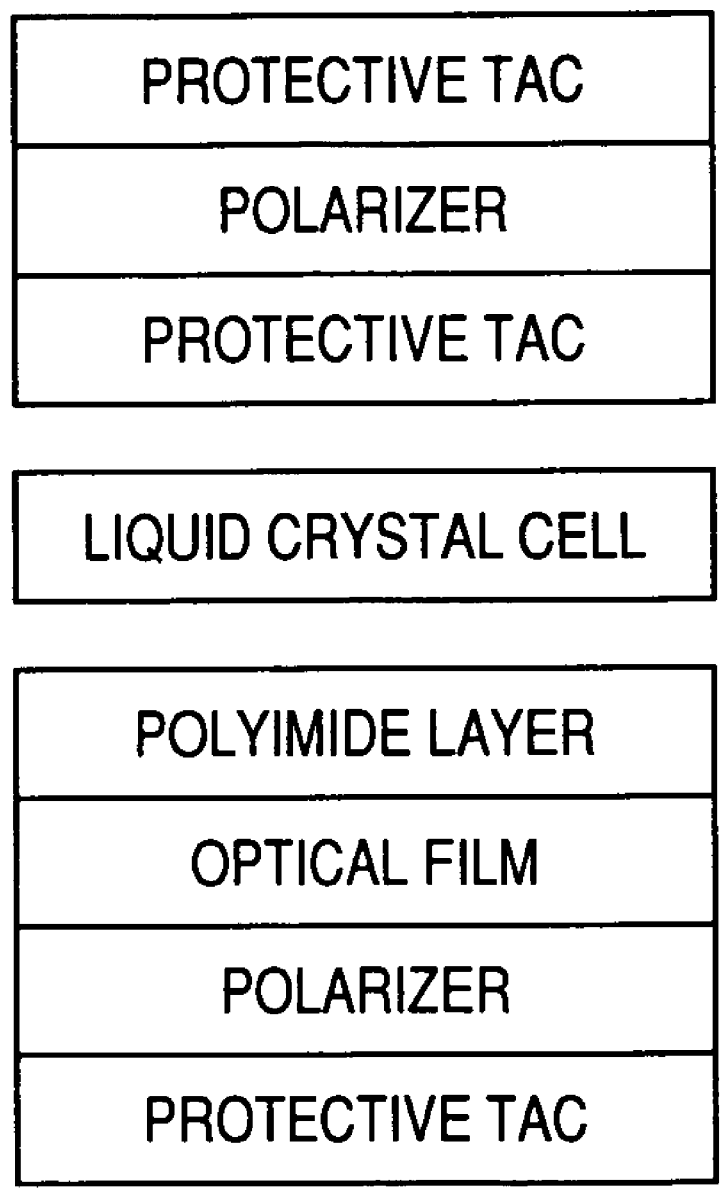
FIG. 15 is a view for illustrating a layer structure of a liquid crystal panel employed in Example.

The polyimide film-free side of the thus-obtained optical compensatory film was stuck onto a protective tac of a polarizing plate via an adhesive, and the layered product was mounted with a layer structure shown in FIG. 15. In this occasion, they were stuck so that the slow axis direction of the optical compensatory film and the absorption axis of the polarizing plate cross at right angles with each other. Additionally, on the opposite side of the liquid crystal cell was stuck only a polarizing plate via an adhesive so that the absorption axes of the polarizing plates cross at right angles with each other.

Comparative Example

An optical compensatory film having a 6-μm thick coated polyimide film was obtained in the same procedures except for coating on the film obtained in Comparative Example 3 in place of the optical film described above. The optical properties of this optical compensatory film was 73 nm in Re(550) and 221 nm in Rth(550). This was mounted with the same layer structure as described above.

Tint properties depending upon viewing angle of the thus-obtained liquid crystal display was measured and, as a result, it was found that the optical compensatory film using the optical film of the invention obtained in Example 2 underwent markedly less change in tint than the optical compensatory film using the film of Comparative Example 3 when viewed from left side, right side, upper side and lower side and showed excellent viewing angle properties.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-236856 filed Aug. 17 of 2005, the contents of which are incorporated herein by reference.

What is claimed is:

1. An optical film comprising a polycarbonate copolymer, the polycarbonate copolymer comprising a repeating unit represented by formula (A) and a repeating unit represented by formula (B), the repeating unit represented by formula (A) amounting to 30 to 80 mol % of the polycarbonate copolymer, the optical film satisfying formulae (1) to (4):

$$0.1 < Re(450)/Re(550) < 0.95 \tag{1}$$

$$1.03 < Re(650)/Re(550) < 1.93 \tag{2}$$

$$0.54 < (Re(450)/Rth(450))/(Re(550)/Rth(550)) < 0.72 \tag{3}$$

$$1.18 < (Re(650)/Rth(650))/(Re(550)/Rth(550)) < 1.47 \tag{4}$$

wherein Re(λ) represents an in-plane retardation value by nm of the optical film for a light having a wavelength of λ nm, and Rth (λ) represents a retardation value by nm in a thickness direction of the optical film for a light having the wavelength of λnm;

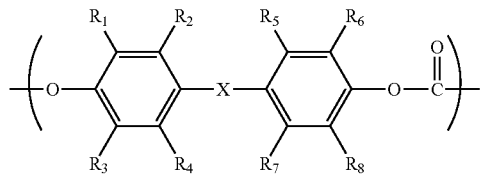

wherein $R_1$ to $R_8$ each independently represents an at least one group selected from the group consisting of a hydrogen atom, a halogen atom and a hydrocarbon group containing from 1 to 6 carbon atoms, and X represents formula (X):

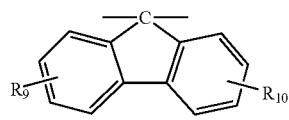

wherein $R_9$ and $R_{10}$ each independently represents a hydrogen atom, a halogen atom or an alkyl group containing from 1 to 3 carbon atoms;

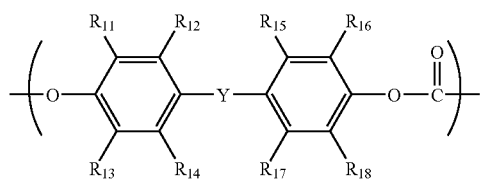

wherein $R_{11}$ to $R_{18}$ each independently represents an at least one group selected from the group consisting of a hydrogen atom, a halogen atom and a hydrocarbon group containing from 1 to 22 carbon atoms, and Y represents a group selected from the following groups:

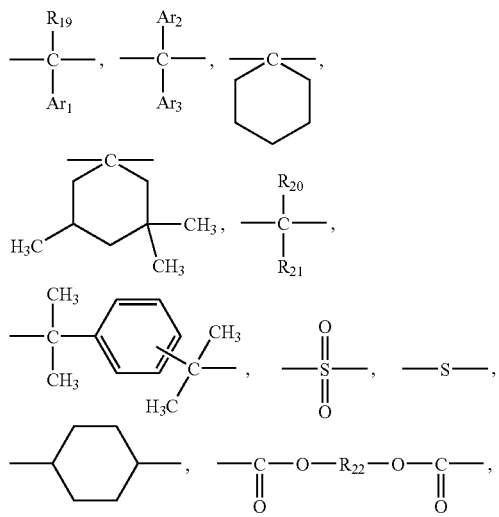

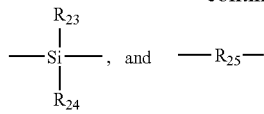

wherein $R_{19}$ to $R_{21}$, $R_{23}$ and $R_{24}$ each independently represents at least one group selected from the group consisting of a hydrogen atom, a halogen atom and a hydrocarbon group containing from 1 to 22 carbon atoms, $R_{22}$ and $R_{25}$ each independently represents an at least one group selected from the group consisting of hydrocarbon groups containing from 1 to 20 carbon atoms, and $Ar_1$ to $Ar_3$ each independently represents at least one group selected from the group consisting of aryl groups containing from 6 to 10 carbon atoms.

2. The optical film as described in claim 1, wherein the repeating unit represented by formula (A) is a repeating unit represented by formula (C), the repeating unit represented by formula (B) is a repeating unit represented by formula (D), the repeating unit represented by formula (C) amounts to 30 to 60 mol % of the polycarbonate copolymer, and the repeating unit represented by formula (D) amounts to 70 to 40 mol % of the polycarbonate copolymer:

wherein $R_{26}$ and $R_{27}$ each independently represents a hydrogen atom or a methyl group;

wherein $R_{28}$ and $R_{29}$ each independently represents a hydrogen atom or a methyl group.

3. The optical film according to claim 1, which further comprises at least one retardation increasing agent comprising a rod-shaped compound or a discotic compound.

4. The optical film according to claim 1, which is a film wet-stretched by a method of forming a film from a solution, with a residual solvent amount being in a range of from 5 to 50% by weight.

5. The optical film according to claim 1, which satisfies formulae (5) and (6):

$$5 < Re(550) < 200 \quad (5)$$

$$10 < Rth(550) < 400. \quad (6)$$

6. An optical compensatory film comprising: an optical film according to claim 1; and an optically anisotropic layer having Re(550) of 0 to 200 nm and Rth(550) of −400 to 400 nm.

7. The optical compensatory film according to claim 6, wherein the optically anisotropic layer comprises a layer formed from a discotic liquid crystalline molecule.

8. The optical compensatory film according to claim 6, wherein the optically anisotropic layer comprises a layer formed from a rod-shaped liquid crystalline molecule.

9. The optical compensatory film according to claim 6, wherein the optically anisotropic layer comprises a polymer film.

10. The optical compensatory film according to claim 9, wherein the polymer film comprises at least one polymer material selected from the group consisting of polyamide, polyimide, polyester, polyether ketone, polyamidoimidopolyesterimide and polyaryl ether ketone.

11. A polarizing plate comprising: a polarizer; and an optical film according to claim 1.

12. A liquid crystal display comprising: two films; and a liquid crystal cell between the two films, wherein at least one of the two films is an optical film according to claim 1.

13. The liquid crystal display according to claim 12, wherein one of the two films is an optical film according to claim 1, and the other of the two films is a film satisfying formulae (7) to (11):

$$0 < Re(550) < 10 \tag{7}$$

$$30 < Rth(550) < 400 \tag{8}$$

$$10 < Rth(550)/Re(550) \tag{9}$$

$$1.0 < Rth(450)/Rth(550) < 2.0 \tag{10}$$

$$0.5 < Rth(650)/Rth(550) < 1.0 \tag{11}$$

wherein $Re(\lambda)$ represents an in-plane retardation value by nm of the film for a light having a wavelength of $\lambda$ nm, and $Rth(\lambda)$ represents a retardation value by nm in the thickness direction of the film for a light having the wavelength of $\lambda$ nm.

14. The liquid crystal display according to claim 12, wherein each of the two films is an optical film according to claim 1.

15. The liquid crystal display according to claim 12, wherein the liquid crystal cell comprises a liquid crystal molecule, wherein a longer axis of the liquid crystal molecule is aligned in a direction substantially vertical to a panel plane of the liquid crystal display in a state of no voltage being applied to the liquid crystal cell.

* * * * *